United States Patent
Sharma et al.

(10) Patent No.: US 11,610,356 B2
(45) Date of Patent: Mar. 21, 2023

(54) METHOD AND ELECTRONIC DEVICE FOR PROVIDING SIGN LANGUAGE

(71) Applicant: SAMSUNG ELECTRONICS CO., LTD., Suwon-si (KR)

(72) Inventors: Deepak Sharma, Noida (IN); Kamya Jaiswal, Noida (IN); Akshar Bhatnagar, Noida (IN); Asif Anis, Noida (IN); Nitin Tanwar, Noida (IN); Pratush Kumar Srivastava, Noida (IN); Sushant Vobbilisetty, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 17/121,048

(22) Filed: Dec. 14, 2020

(65) Prior Publication Data
US 2022/0036625 A1    Feb. 3, 2022

(30) Foreign Application Priority Data
Jul. 28, 2020 (IN) .............................. 202041032357

(51) Int. Cl.
*G06T 13/40*     (2011.01)
*G06T 17/00*     (2006.01)
(Continued)

(52) U.S. Cl.
CPC ............ *G06T 13/40* (2013.01); *G06N 20/00* (2019.01); *G06T 17/00* (2013.01); *G10L 15/02* (2013.01); *G10L 15/26* (2013.01); *G10L 25/27* (2013.01)

(58) Field of Classification Search
CPC ......... G06T 13/40; G06T 17/00; G06N 20/00; G06N 3/0445; G06N 3/0454; G06N 3/08;
(Continued)

(56) References Cited

U.S. PATENT DOCUMENTS 5,659,764 A    8/1997   Sakiyama et al.
6,477,239 B1  11/2002   Ohki et al.
(Continued)

FOREIGN PATENT DOCUMENTS

CN    101502094    5/2012
KR    10-2011-0087742    8/2011
(Continued)

OTHER PUBLICATIONS

Aarons, Debra. "Topics and topicalization in American sign language." Stellenbosch Papers in Linguistics 30 (1996), Publication Date: 1996, pp. 65-106.
(Continued)

*Primary Examiner* — Abderrahim Merouan
(74) *Attorney, Agent, or Firm* — Nixon & Vanderhye P.C.

(57) ABSTRACT

A method for providing sign language is disclosed. The method includes receiving, by an electronic device, a natural language information input from at least one source for conversion into sign language. The natural language information input includes at least one sentence. The method further includes predicting, by the electronic device, an emphasis score for each word of the at least one sentence based on acoustic components. The method further includes rephrasing, by the electronic device, the at least one sentence based on the emphasis score of each of the words. The method further includes converting, by the electronic device, the at least one rephrased sentence into the sign language. The method further includes delivering, by the electronic device, the sign language.

16 Claims, 23 Drawing Sheets

(51) Int. Cl.
*G06N 20/00* (2019.01)
*G10L 15/02* (2006.01)
*G10L 25/27* (2013.01)
*G10L 15/26* (2006.01)

(58) Field of Classification Search
CPC ......... G10L 15/02; G10L 15/26; G10L 25/27; G06V 10/764; G06V 40/28; G06K 9/6262; G06K 9/6271; G06K 9/6256; G09B 21/00; G09B 21/009; G09B 5/02
See application file for complete search history.

(56) References Cited

U.S. PATENT DOCUMENTS

| | | | |
|---|---|---|---|
| 7,746,986 B2 | 6/2010 | Bucchieri et al. | |
| 7,827,034 B1 | 11/2010 | Munns | |
| 9,800,955 B2* | 10/2017 | An | H04N 21/854 |
| 2003/0191779 A1* | 10/2003 | Sagawa | G09B 21/00 |
| 2005/0243092 A1 | 11/2005 | Haratsch et al. | |
| 2006/0134585 A1* | 6/2006 | Adamo-Villani | G09B 21/009 434/112 |
| 2006/0290699 A1 | 12/2006 | Dimtrva et al. | |
| 2013/0204605 A1 | 8/2013 | Illgner-Fehns | |
| 2013/0271456 A1* | 10/2013 | Haswell | G06T 19/003 345/420 |
| 2015/0317304 A1* | 11/2015 | An | G10L 15/26 386/285 |
| 2016/0293051 A1* | 10/2016 | Djugash | G09B 21/009 |
| 2017/0243519 A1* | 8/2017 | Teshima | H04N 21/47 |
| 2017/0243520 A1* | 8/2017 | Teshima | H04R 3/00 |
| 2017/0303052 A1* | 10/2017 | Kakareka | G08B 6/00 |
| 2018/0122266 A1* | 5/2018 | Azartash | A63H 3/28 |
| 2018/0260680 A1* | 9/2018 | Finkelstein | G06N 5/04 |
| 2020/0034609 A1* | 1/2020 | Chandler | G06V 10/764 |

FOREIGN PATENT DOCUMENTS

| | | |
|---|---|---|
| KR | 10-1104777 | 1/2012 |
| KR | 10-2015-0060348 | 6/2015 |

OTHER PUBLICATIONS

Choi et al., "From Text To Sign Language: Exploiting the Spatial and Motioning Dimension", Section 4.3, [Dec. 2005], 10 pages.
[ONLINE], American Sign language grammar[https://www.lifeprint.com/asl101/pages-layout/grammar.htm], Apr. 27, 2020, 10 pages.
Wollmer et al., "Youtube movie reviews: Sentiment analysis in an audio-visual context." IEEE Intelligent Systems 28.3 (2013), May 2013, pp. 46-53.
Wu et al. "Google's neural machine translation system: Bridging the gap between human and machine translation." arXiv preprint arXiv:1609.08144 (2016), Oct. 2016, 23 pages.
Sutskever et al., "Sequence to sequence learning with neural networks", In Advances in Neural Information Processing Systems (2014), Dec. 2014, pp. 3104-3112.
Simon Dixon, "Onset detection revisited." Proceedings of the 9th International Conference on Digital Audio Effects. vol. 120. 2006, Sep. 2006, 6 pages.
[Online], ASL sentence structure [https://www.youtube.com/watch?v=nzrbvMeoBnE], Jun. 13, 2019, 2 pages.

* cited by examiner

METHOD AND ELECTRONIC DEVICE FOR PROVIDING SIGN LANGUAGE

CROSS REFERENCE TO RELATED APPLICATION

This application is based on and claims priority under 35 U.S.C. § 119 to Indian Patent Application No. 202041032357, filed Jul. 28, 2020, in the Indian Patent Office, the disclosure of which is incorporated by reference herein in its entirety.

BACKGROUND

1. Field

The disclosure relates to electronic devices, and for example, to a method and an electronic device for providing sign language.

2. Description of Related Art

In general, deaf people have difficulty watching news or movies. Even subtitles are not enough for the deaf people to understand the news or movie contents. A sign language may refer, for example, to a fluent medium of communication for the deaf people. For a conversion of the audio-visual data requires a human interpreter, practically the human interpreter is expensive and having the human interpreter for daily activities is challenging. Moreover, existing sign languages and multi-lingual translation include limited vocabulary and word-sign representation.

A major impact of hearing loss is an individual's ability to communicate with others which causes feelings of loneliness, isolation, and frustration. Even with the sign language, the deaf people may be unable to clearly understand an intent of a sentence.

Thus, it is desired to address the above-mentioned problems and provide a useful alternative for providing sign language.

SUMMARY

Embodiments of the disclosure provide a method and an electronic device for providing a sign language. Embodiments of the disclosure provide an enhanced sign language when a user wishes to know an intent of a sentence coming from a natural language information input.

Embodiments of the disclosure rephrase a sentence based on an emphasis score of each of words. Unlike an existing approach, embodiments of the disclosure rephrase the sentence obtained from the natural language information input based on an emphasis score of each of the words so that instead of delivering the sign language in a static way to the user, embodiments deliver the sign language to the user based on the emphasis score to the user for better understanding of the intent of the sentence coming from the natural language information input. Hence increasing an overall experience of the user.

Embodiments of the disclosure may determine a sound direction corresponding to the word from a plurality of words of the input sentence. Embodiments may indicate a direction of sound to the user so that the user is aware of the direction of sound.

Embodiments of the disclosure provide a facial expression to a three-dimensional character while delivering a sign language character from a sequence of the sign language characters. Embodiments may add sentiments to the three-dimensional character to increase the user experience.

According to an example embodiment, a method for providing a sign language is provided. The method includes: receiving, by an electronic device, a natural language information input from at least one source for conversion into the sign language, the natural language information input including at least one sentence; predicting, by the electronic device, an emphasis score for each word of the at least one sentence based on acoustic components; rephrasing, by the electronic device, the at least one sentence based on the emphasis score of each of the words; converting, by the electronic device, the at least one rephrased sentence into the sign language; and delivering, by the electronic device, the sign language.

In an example embodiment, the method further includes determining, by the electronic device, a sound direction corresponding to at least one word from the plurality of words of the at least one input sentence. The method may further include automatically displaying, by the electronic device, an indication indicating the sound direction while delivering the at least one word of the at least one input sentence in the sign language.

In an example embodiment, the predicting, by the electronic device, an emphasis score for each word of the at least one sentence based on the acoustic components includes extracting, by the electronic device, text features from the natural language information input based on a speech-to-text analysis, extracting, by the electronic device, the acoustic components from the natural language information input based on an acoustic sentiment analysis, and predicting, by the electronic device, the emphasis score for each of the words of the at least one sentence by applying a machine learning based emphasis model on the text features and the acoustic components.

In an example embodiment, the machine learning based emphasis model is trained based on at least one dataset of audio labeled with emphasize words.

In an example embodiment, the rephrasing, by the electronic device, the at least one sentence based on the emphasis score of each of the words includes determining, by the electronic device, a sequence of words in the at least one sentence, and rephrasing, by the electronic device, the at least one sentence by applying a machine learning based sentence rephrasing model on the emphasis score of each of the words and the sequence of words.

In an example embodiment, the machine learning based sentence rephrasing model is trained based on at least one of sign language grammar, sentence rephrasing model and text sentiment analysis.

In an example embodiment, the converting, by the electronic device, the at least one rephrased sentence into the sign language includes performing, by the electronic device, a natural language processing (NLP) on the at least one rephrased sentence, and converting, by the electronic device, the at least one rephrased sentence into the sign language.

In an example embodiment, the delivering, by the electronic device, the sign language includes generating, by the electronic device, a sequence of sign language characters corresponding to the at least one rephrased sentence and each of the words in the at least one rephrased sentence is associated with the emphasis score, generating, by the electronic device, a three-dimensional model to deliver the sequence of the sign language characters, applying, by the electronic device, an effect on each of the sign language character corresponding to each word of the at least one rephrased sentence based on the emphasis score, and delivering, by the electronic device, the sequence of the sign language characters with the applied effect through the three-dimensional model.

In an example embodiment, the effect comprises at least one of providing a facial expression to a three-dimensional character while delivering the sign language character from the sequence of the sign language characters. The method may further include extending a time of delivery of at least one sign language character from the sequence of the sign language characters to clearly understand an intent of the sign language.

In an example embodiment, the method further includes providing, by the electronic device, a smooth transition of gestures of the three-dimensional character based on the at least one rephrased sentence while delivering the sign language.

In an example embodiment, the disclosure provides an electronic device for providing a sign language. The electronic device includes: a memory, a processor and a sign language controller, communicatively connected to the memory and the processor and configured to: receive a natural language information input from at least one source for conversion into the sign language, the natural language information input comprising at least one sentence; predict an emphasis score for each word of the at least one sentence based on acoustic components; rephrase the at least one sentence based on the emphasis score of each of the words; convert the at least one rephrased sentence into the sign language; and deliver the sign language.

These and other aspects of the various example embodiments herein will be better appreciated and understood when considered in conjunction with the following description and the accompanying drawings. It should be understood, however, that the following descriptions, while indicating example embodiments and numerous details thereof, are given by way of illustration and not of limitation. Many changes and modifications may be made within the scope of the embodiments herein without departing from the spirit thereof, and the example embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
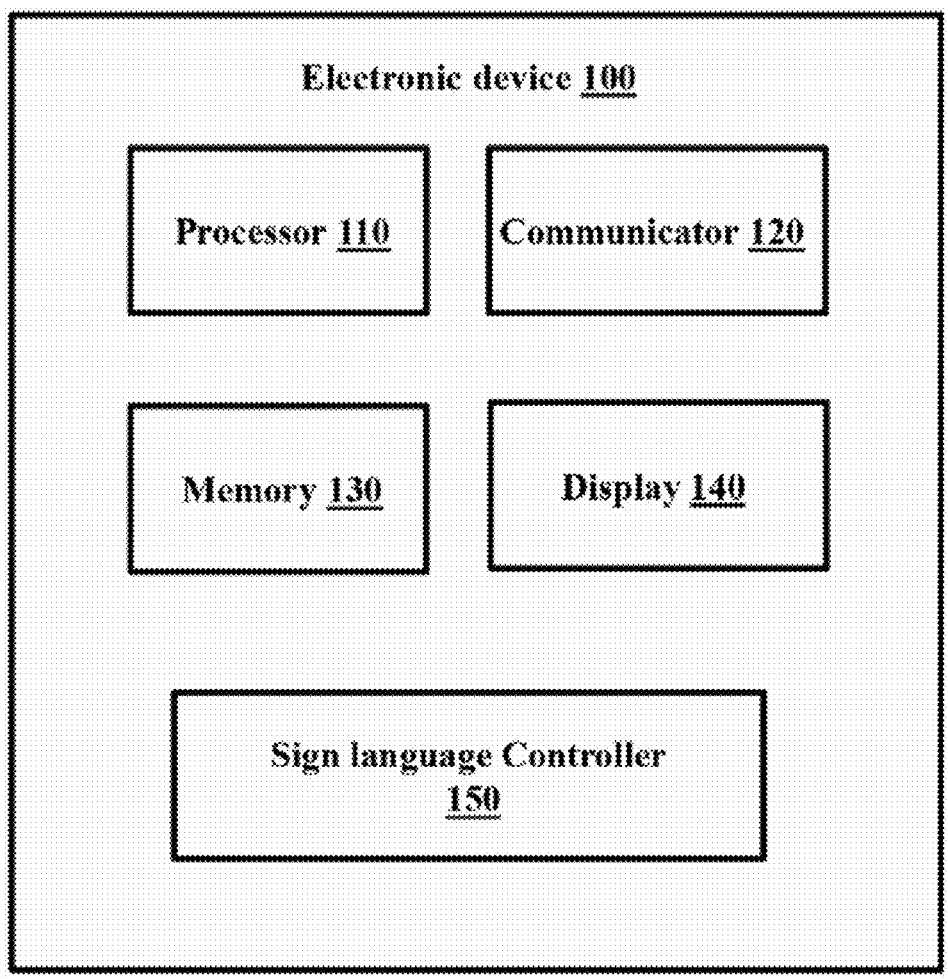
FIG. 1 is a block diagram illustrating an example electronic device, according to various embodiments.

The various example embodiments disclosed and described herein and the various features and advantageous details thereof are explained more fully with reference to the non-limiting embodiments that are illustrated in the accompanying drawings and detailed in the following description. Descriptions of well-known components and processing techniques may be omitted where they unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions.

These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Various embodiments herein provide a method for providing a sign language. The method may include: receiving, by an electronic device, a natural language information input from a source for conversion into the sign language, the natural language information input including a sentence or acoustic components; predicting, by the electronic device, an emphasis score for each word of the sentence based on the acoustic components; rephrasing, by the electronic device, the sentence based on the emphasis score of each of the words; converting, by the electronic device, the rephrased sentence into the sign language; and delivering, by the electronic device, the sign language.

Unlike conventional methods and electronic devices, with the proposed method, the electronic device may analyze a speech pattern from a natural language information input by rephrasing a sentence based on an emphasis score. The method may further use contextual analysis on the natural language information input to determine emphasis on words for generating a sign language which is more realistic contextual interpretation of the natural language information input. The method may further provide a visual representation of direction of sound on an electronic device display.

Referring now to the drawings, and more particularly to FIGS. 1 through 14e, where similar reference characters denote corresponding features throughout the figures, there are shown various example embodiments.

FIG. 1 is a block diagram illustrating an example electronic device (100), according to various embodiments. The electronic device (100) includes a processor (e.g., including processing circuitry) (110), a communicator (e.g., including communication circuitry) (120), memory (130), a display (140), and a sign language controller (e.g., including processing circuitry and/or executable program elements) (150). The processor (110) is coupled with the memory (130), the communicator (120), the display (140), and a sign language controller (150). In an embodiment, the electronic device (100) may, for example, include, but is not limited to, a smart watch, a smart phone, an Artificial intelligent (AI) speaker, an Internet of things (IoT) sensor, a laptop, a smart social robot, a Personal Digital Assistant (PDA), a tablet computer, a laptop computer, a music player, a video player, or the like.

In an embodiment, the sign language controller (150) may include various processing circuitry and/or executable program elements and may be configured to receive a natural language information input from a source for conversion into the sign language. The natural language information input may include the sentence or acoustic components. The source may include a text, an audio, a direction of sound and the like. The sign language controller (150) predicts an emphasis score for each word of the sentence based on the acoustic components. The sign language controller (150) rephrases the sentence based on the emphasis score of each of the words. The sign language controller (150) then converts the rephrased sentence into the sign language and delivers the sign language to be displayed on the display (140).

The direction of sound corresponding to a word from a plurality of words of the rephrased sentence is determined by the sign language controller (150). The sign language controller (150) automatically displays an indication indicating the sound direction while delivering the word of the rephrased sentence in the sign language.

In an embodiment, the sign language controller (150) extracts text features and the acoustic components from the natural language information input based on a speech-to-text analysis and an acoustic sentiment analysis to predict the emphasis score for each of the words of the sentence by applying a machine learning based emphasis model on the text features and the acoustic components. The machine learning based emphasis model is trained based on a dataset of audio labeled with emphasize words.

In an embodiment, the sign language controller (150) determines a sequence of words in the sentence for rephrasing the sentence by applying the machine learning based sentence rephrasing model on the emphasis score of each of the words and the sequence of words. The machine learning based sentence rephrasing model is trained based on a sign language grammar, a sentence rephrasing model and a text sentiment analysis.

In an embodiment, the sign language controller (150) performs a natural language processing (NLP) on the rephrased sentence for converting the rephrased sentence into the sign language. In an embodiment, the sign language controller (150) generates a sequence of sign language characters corresponding to the rephrased sentence for generating a three-dimensional model to deliver the sequence of the sign language characters. For example, consider a sentence 'I never said she stole the money', in a rephrased sentence for a user, the word 'stole' is given a high emphasis score so that the three-dimensional model may deliver the sequence of words based on the emphasis score. Each of the words in the rephrased sentence is associated with the emphasis score. The sign language controller (150) applies an effect on each of the sign language character corresponding to each word of the rephrased sentence based on the emphasis score.

The sign language controller (150) delivers the sequence of the sign language characters with the applied effect through the three-dimensional model. The effect may include, for example, providing a facial expression to a three-dimensional character while delivering the sign language character from the sequence of the sign language characters. The sign language controller (150) extends a time of delivery of a sign language character from the sequence of the sign language characters to clearly understand an intent of the sign language. The electronic device (100) provides smooth transition of gestures of the three-dimensional character based on the at least one rephrased sentence while delivering the sign language.

The processor (110) may include various processing circuitry and is configured to execute instructions stored in the memory (130) and to perform various processes. The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The "non-transitory" storage medium may not be embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 1 shows various hardware components of the electronic device (100) it is to be understood that other embodiments are not limited thereto. In various embodiments, the electronic device (100) may include less or a greater number of components. Further, the labels or names of the components are used only for illustrative purpose and does not limit the scope of the invention.

Figure 2:
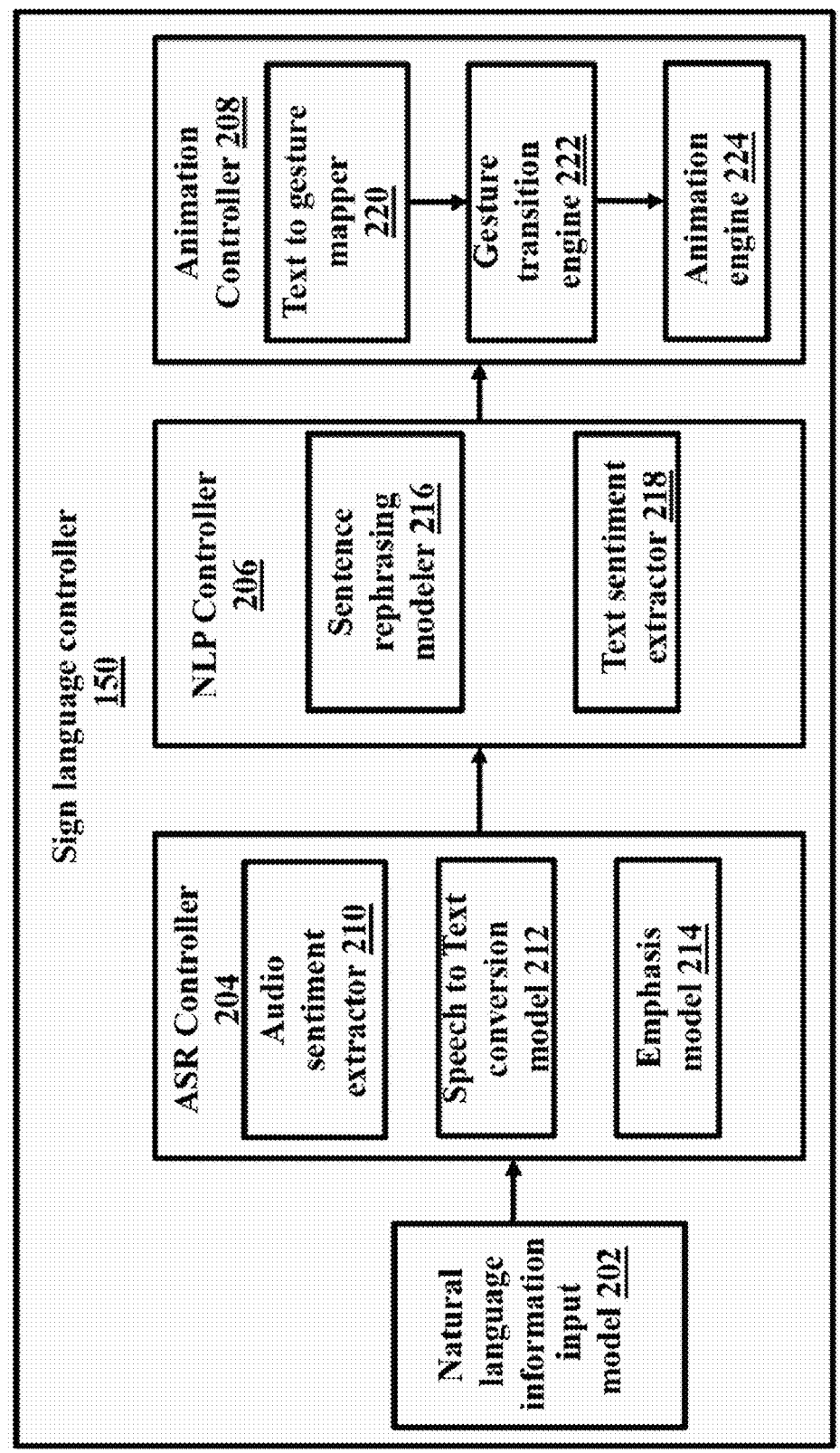
FIG. 2 is a block diagram illustrating an example sign language controller, according to various embodiments.

FIG. 2 is a block diagram illustrating an example of the sign language controller (150) according to various embodiments. In an embodiment, the sign language controller (150) includes a natural language information input model (e.g., including processing circuitry and/or executable program elements) (202), an Audio Sentiment Extraction (ASR) controller (e.g., including processing circuitry and/or executable program elements) (204), a Natural language Processing (NLP) controller (e.g., including processing circuitry and/or executable program elements) (206), and an animation controller (e.g., including processing circuitry and/or executable program elements) (208). The natural language information input model (202) provides the natural language information input. The ASR controller (204) includes an audio sentiment extractor (e.g., including processing circuitry and/or executable program elements) (210), a speech to text conversion model (e.g., including processing circuitry and/or executable program elements) (212), and an emphasis detector (e.g., including processing circuitry and/or executable program elements) (214). The audio sentiment extractor (210) may include various processing circuitry and/or executable program elements and extracts a sentiment from an audio. The speech-to-text conversion model (212) may include various processing circuitry and/or executable program elements and converts the audio (202) into a sequence of words. The emphasis detector (214) may include various processing circuitry and/or executable program elements and detects an emphasis score of each of the words. The sequence of words may include the sentence. For example, if a communication intended is a question ("You got the job" is very different semantically from "You got the job?"), or to add emotional context (happy, disappointed, energetic, and the like).

In an embodiment, the NLP controller (206) includes a sentence rephrasing modeler (e.g., including processing circuitry and/or executable program elements) (216) and a text sentiment extractor (e.g., including processing circuitry and/or executable program elements) (218). The sentence rephrasing modeler (216) may include various processing circuitry and/or executable program elements and rephrases the sentence based on the emphasis score of each of the words.

In an embodiment, the animation controller (208) includes a text to gesture mapper (e.g., including processing circuitry and/or executable program elements) (220), a gesture transition engine (e.g., including processing circuitry and/or executable program elements) (222), and an animation engine (e.g., including processing circuitry and/or executable program elements) (224). The text to gesture mapper (220) may include various processing circuitry and/or executable program elements and generates a sequence of sign language characters corresponding to the rephrased sentence and maps the rephrased sentence into a three-dimensional model to deliver a sequence of the sign language characters. The gesture transition engine (222) may include various processing circuitry and/or executable program elements and applies an effect on each of the sign language character corresponding to each word of the rephrased sentence based on the emphasis score. The animation engine (224) may include various processing circuitry and/or executable program elements and delivers the sequence of the sign language characters with the applied effect through the three-dimensional model. The applied effect includes providing a facial expression to the three-dimensional character while delivering the sign language character from the sequence of the sign language characters.

Figure 3:
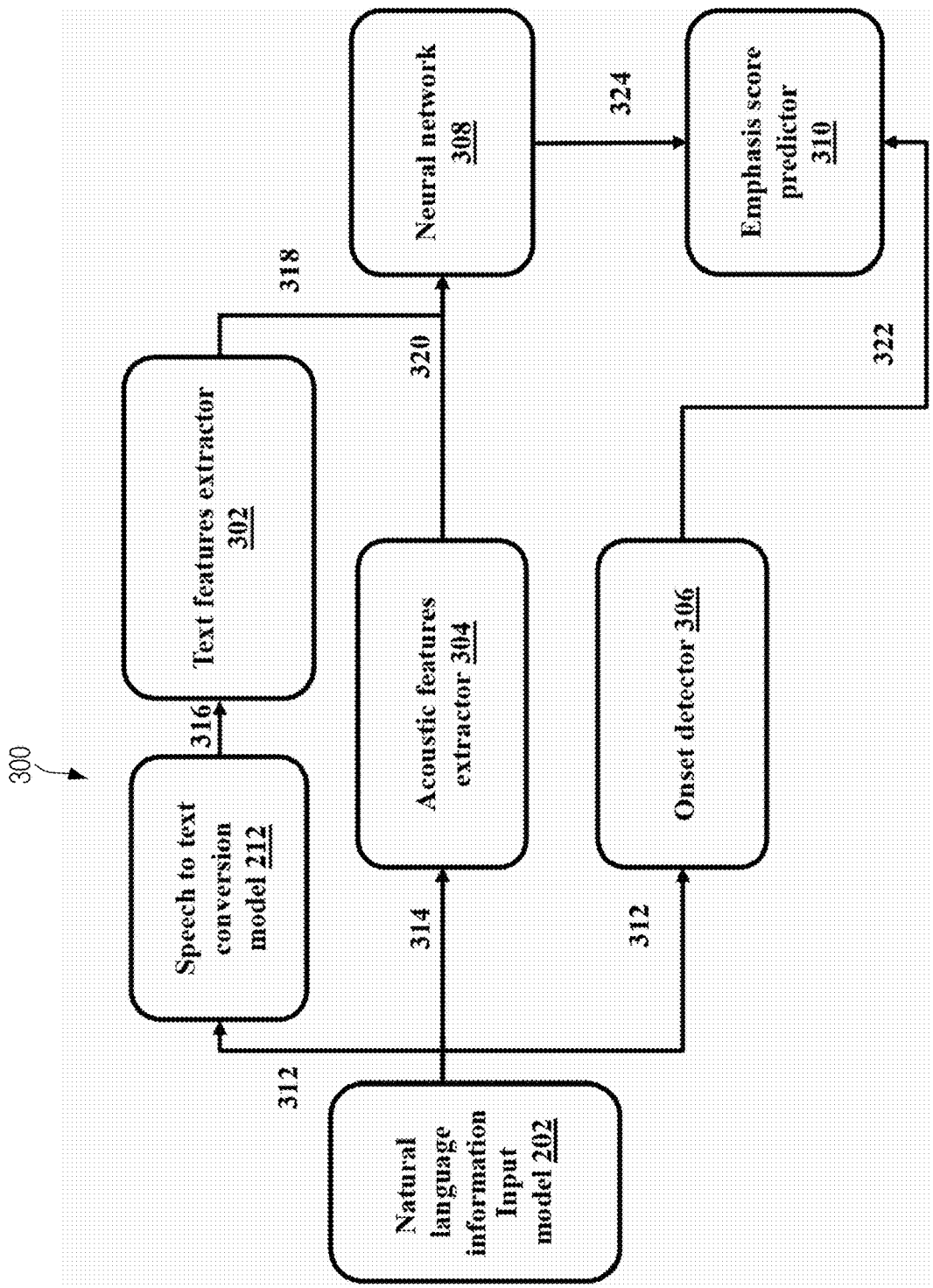
FIG. 3 is a block diagram illustrating an example method of predicting emphasis scores using a natural language information input, according to various embodiments.

FIG. 3 is a block diagram (300) illustrating an example method of predicting emphasis scores using a natural language information input, according to various embodiments. The block diagram (300) includes the natural language information input model (202), the speech to text conversion model (212), text features extractor (e.g., including processing circuitry and/or executable program elements) (302), acoustic features extractor (e.g., including processing circuitry and/or executable program elements) (304), an onset detector (e.g., including processing circuitry and/or executable program elements) (306), a neural network (e.g., including processing circuitry and/or executable program elements) (308), and an emphasis predictor (e.g., including processing circuitry and/or executable program elements) (310). The text features extractor (302) may include various processing circuitry and/or executable program elements and extracts text features from the natural language information input such as a text (316). The acoustic features extractor (304) may include various processing circuitry and/or executable program elements and extracts acoustic features (320) from the natural language information input such as recorded or analyzed speech (314). The onset detector (306) may include various processing circuitry and/or executable program elements and detects sequences of word onsets from the audio (312). The neural network (308) may include various processing circuitry and/or executable program elements and combines the extracted text features (318) and the extracted acoustic features (320) for predicting the emphasis scores. The emphasis score predictor (310) may include various processing circuitry and/or executable program elements and analyses the combined sequence of features (324) and the sequences of words (322) to predict the emphasis scores.

In an embodiment, a word with a highest emphasis score is determined. In an embodiment, the emphasis score is between [0, 1] where 1 being the highest emphasis score. The recorded or the analyzed speech (314) includes a duration of the natural language information input, a frequency of the natural language information input, a standard deviation of the natural language information input, and an intensity of the natural language information input. The text (312) includes a word, syllable identity, a total number of words in the natural language information input, a word position value in the natural language information input, a term frequency*inverse document frequency, a negative log frequency Broad or a specific word class exclamation, negation.

Figure 4:
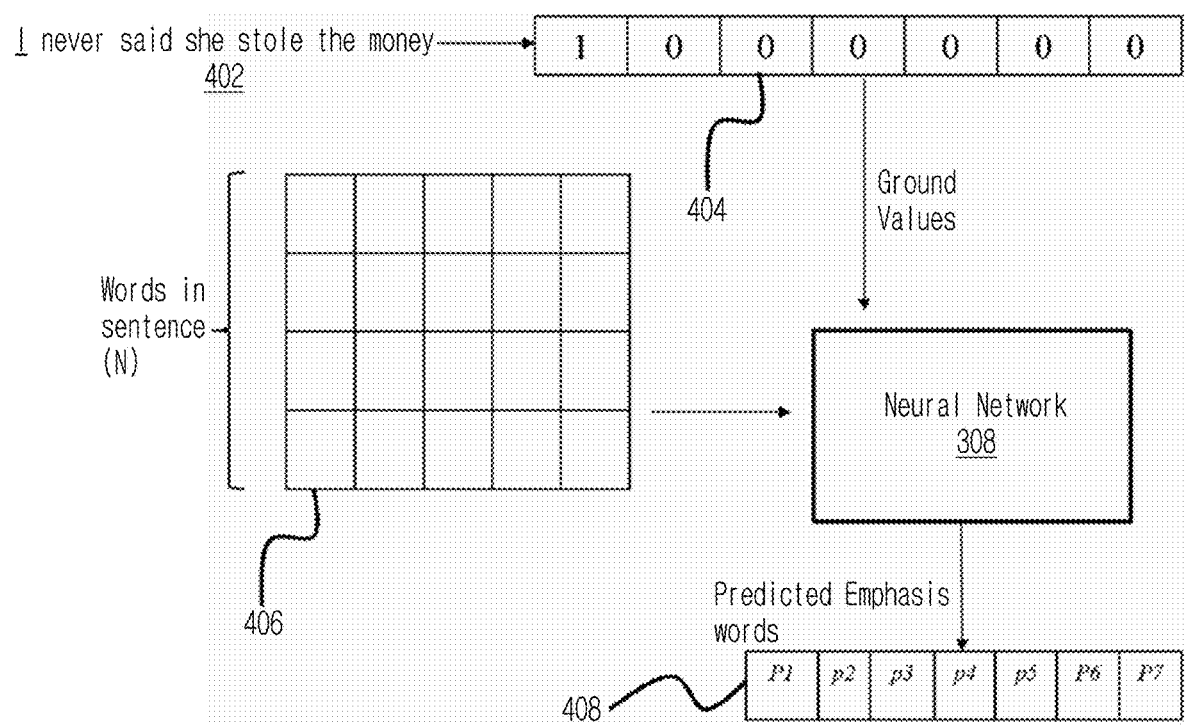
FIG. 4 is a diagram illustrating an example process of training an emphasis model using a neural network, according to various embodiments.

FIG. 4 is a diagram illustrating an example process of training an emphasis model (214) using a neural network (308), according to various embodiments. In an embodiment, the emphasis model (214) uses datasets of audio and the datasets are manually labeled with emphasize words. For example, consider a sentence "I never said she stole the money (402)" where the emphasis is given on the word "I". The sentence (402) is converted into a sequence of words (406) and ground values (404). The emphasized word "I" is manually labeled with 0s or 1s. The manually labeled words with 0s indicate not emphasized words and the manually labeled words with 1s indicate the emphasized words. The sequence of words (406) and the ground values (404) is given as an input to the neural network (308). The predicted emphasized words (p) (408) includes P1, P2, P3, P4, P5, P6, and P7. The P1 indicated the emphasized word "I". The P2 to P7 indicates the not emphasized words the sentence for example "never said she stole the money".

Figure 5:
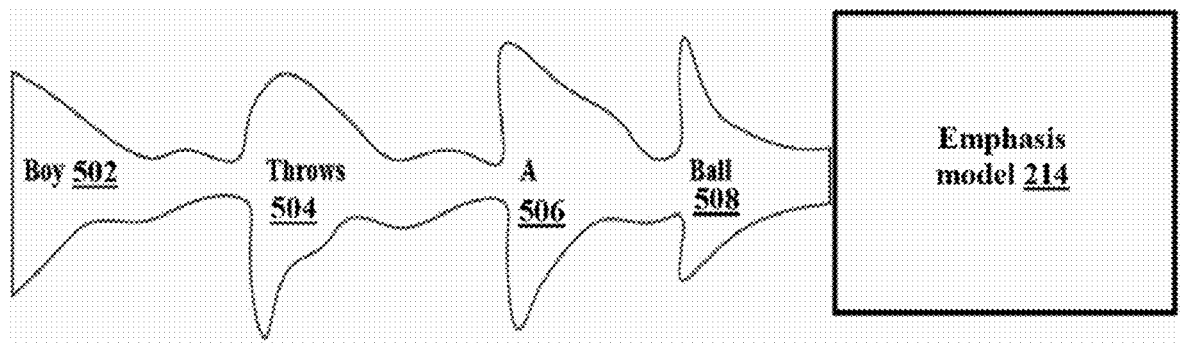
FIG. 5 is a diagram illustrating an example of an emphasis model acquiring timestamps for spoken words from the natural language information input, according to various embodiments.

FIG. 5 is a diagram illustrating an example of the emphasis model (214) acquiring timestamps for spoken words from the natural language information input, according to various embodiments. In an embodiment, the onset detection is the emphasis model (214) to acquire the timestamps for the spoken words from the natural language information input. An onset is detected using a Librosa python package for an audio analysis. The librosa python package locates onset events by picking peaks in a spectral flux envelope. The user speaks the words boy (502), throws (504), a (506), and ball (508), where the emphasis given by the user is on the word ball (508) compared to other words as shown in FIG. 5. The emphasis model (214) assigns the emphasis score on the word ball (508). The words (502)-(508) from the sentence is separated using the onset detection.

Figure 6:
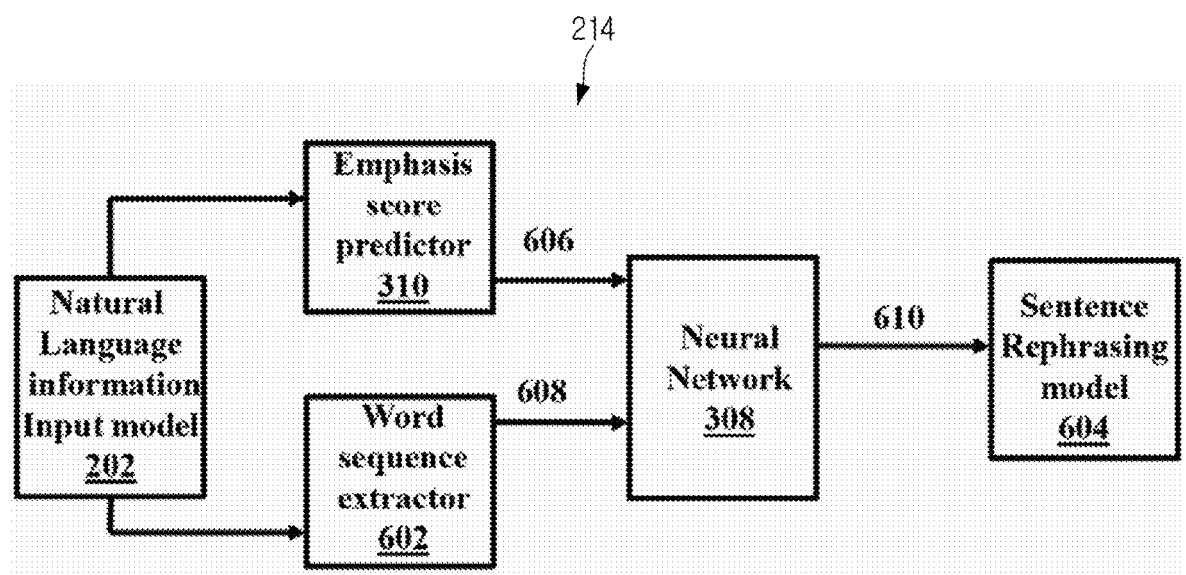
FIG. 6 is a block diagram illustrating an example emphasis model, according to various embodiments.

FIG. 6 is a block diagram illustrating an example of the emphasis model (214), according to various embodiments. The emphasis model (214) includes the natural language information input model (202), the emphasis score predictor (310), a word sequence extractor (e.g., including processing circuitry and/or executable program elements) (602), the neural network (308), and a sentence rephrasing model (e.g., including processing circuitry and/or executable program elements) (604). The natural language information input is divided into the emphasis score and a word sentence. The emphasis score (606) and the word sentence (608) is given to the neural network (308) for combining the emphasis score (606) and the word sentence (608). A combined sentence (610) is given to a sentence rephrasing model (604) which may include various processing circuitry and/or executable program elements for generating a rephrased sentence. In an embodiment, the natural language information input and the rephrased sentence is padded to maintain same length. In an embodiment, the sentence is rephrased using a machine learning based rephrase model or a parse tree such as a heuristic algorithm. The neural network (308) may be a recurrent neural network (RNN). The RNN translated one language to other. The natural language information input includes the sequence of words along with the emphasis scores as calculated by the emphasis model (214) of the ASR controller (204). The machine learning based rephrase model is trained using the sentence and the sentence is ordered based on the emphasized words. The parse tree makes the emphasized word a topic of the sentence.

Figure 7:
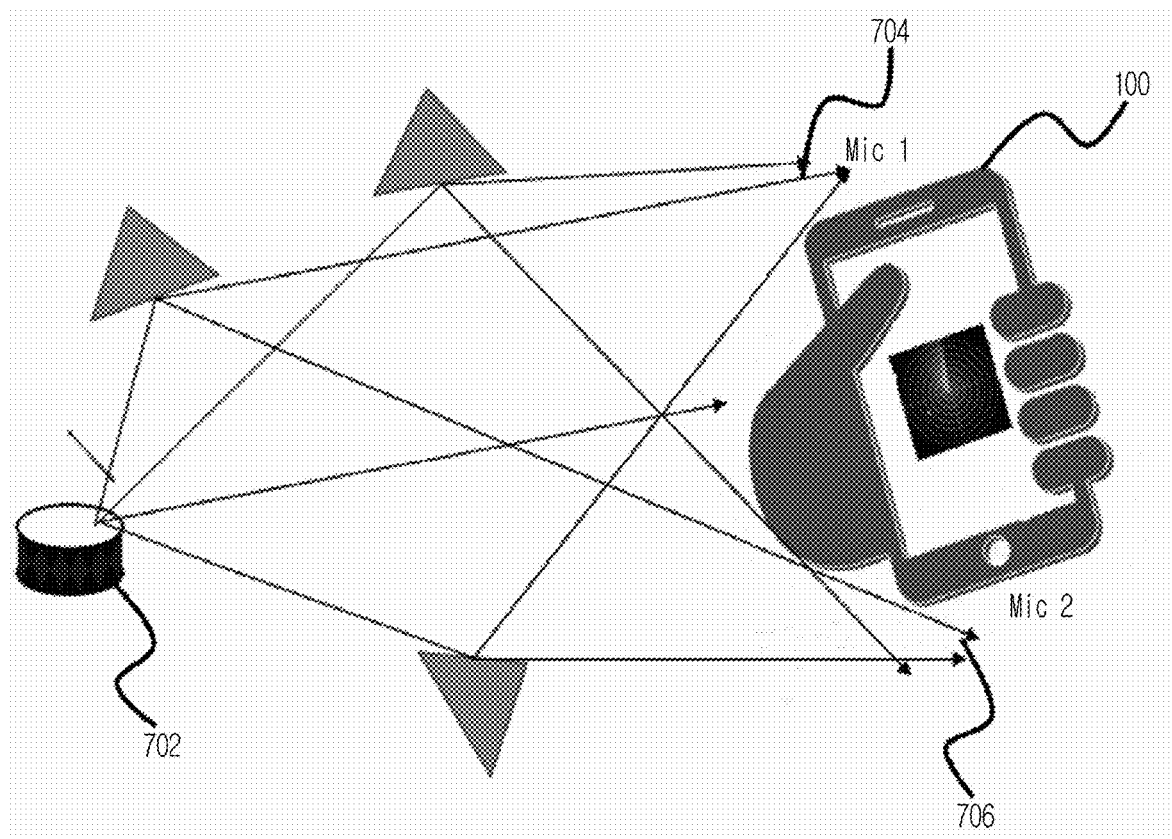
FIG. 7 is a diagram illustrating an example natural language information input model for measuring a direction of sound, according to various embodiments.

FIG. 7 is a diagram illustrating an example of the natural language information input model (202) for measuring a direction of sound, according to various embodiments. In an embodiment, the electronic device (100) includes stereo speakers. The stereo speakers include a mic 1 and mic 2. A sound travel in all directions from a sound source (702). The stereo speakers receive a sound signal with different time delay, volume and frequency. The sound from the sound source (702) reached the mic 1 in a given arrow direction (704). The sound from the sound source (702) reached the mic 2 in a given arrow direction (706). A Head-Relay Transfer Function (HRTF) function identifies each wave received by the mic 1 and mic 2 using the sound signal. The HRTF function is represented by three parameters such as azimuth, elevation and scalar distance. The mic near to the sound source receives sound signals earlier than the mic which is far from the sound source. The sound intensity changes based on distance traveled so the mic closer to the sound source will receive high intensity. All high frequency waves will be reflected and mostly low frequency waves will reach to the far mic.

Figure 8:
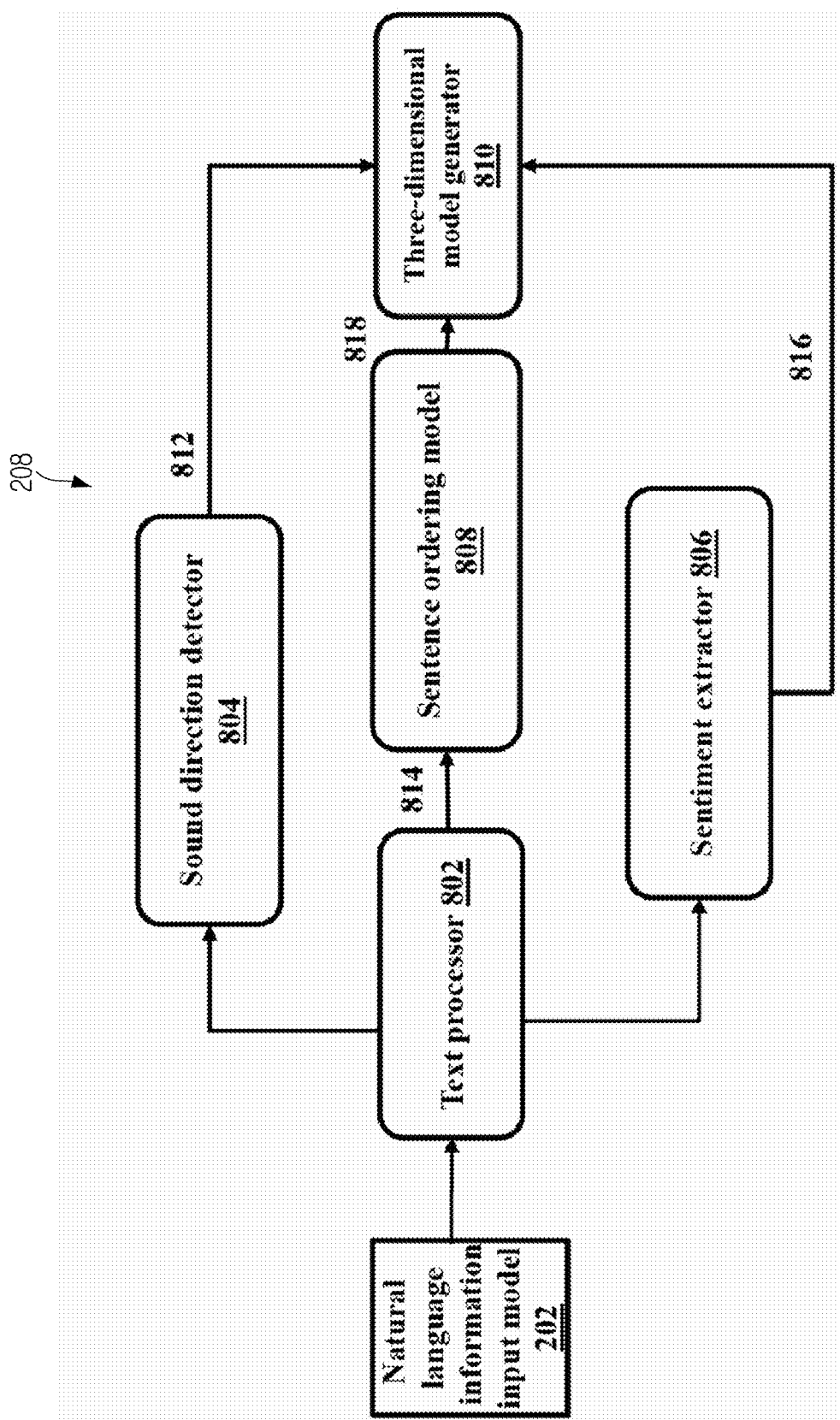
FIG. 8 is a block diagram illustrating an example animation controller, according to various embodiments.

FIG. 8 is a block diagram illustrating an example animation controller (208), according to various embodiments. The animation controller (208) includes the natural language information input model (202), a text processor (e.g., including processing circuitry and/or executable program elements) (802), a sound direction detector (e.g., including processing circuitry and/or executable program elements) (804), a sentiment extractor (e.g., including processing circuitry and/or executable program elements) (806), a sentence ordering model (e.g., including processing circuitry and/or executable program elements) (808), and a three-dimensional model generator (e.g., including processing circuitry and/or executable program elements) (810). The text processor (802) may include various processing circuitry and/or executable program elements and processes texts (814) from the natural language information input. The sound direction detector (804) may include various processing circuitry and/or executable program elements and detects the direction of sound (812) from the natural language information input. The sentiment extractor (806) may include various processing circuitry and extracts sentiments (816) from the natural language information input. The sentence ordering model (808) may include various processing circuitry and/or executable program elements and orders the processed text into the sentence (818). The three-dimensional model generator (810) generates a three-dimensional model based on the sentence (818), the direction of sound (812) and the sentiments (816).

Figure 9:
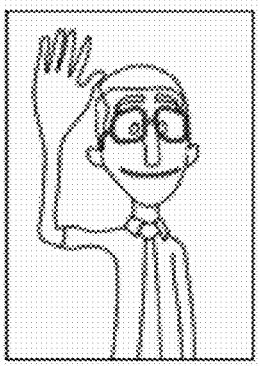
FIG. 9 is a diagram an example of a three-dimensional model providing a sign language, according to various embodiments.
Figure 9:
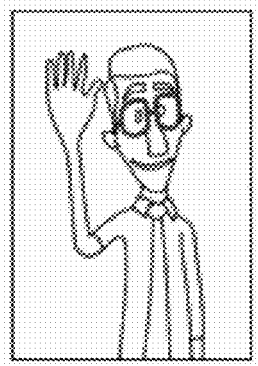
Figure 9:
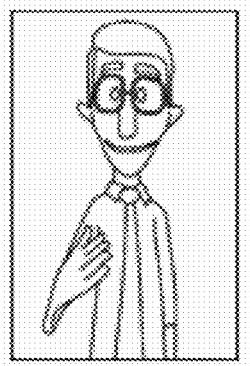
Figure 9:
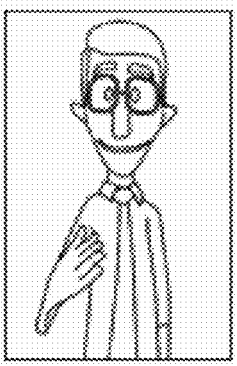
Figure 9:
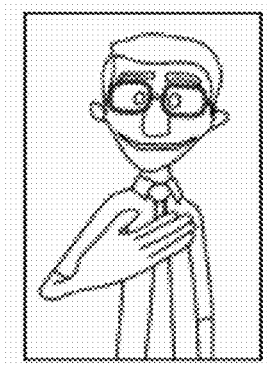
Figure 9:
Figure 9:
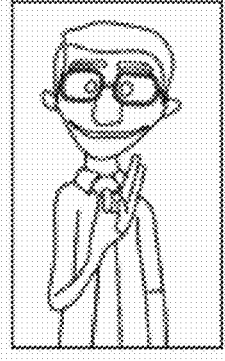
Figure 9:
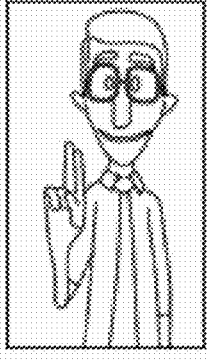

FIG. 9 is a diagram illustrating an example of a three-dimensional model providing the sign language, according to various embodiments. The three-dimensional model (900) provides the sign language of the sentence.

Figure 10A:
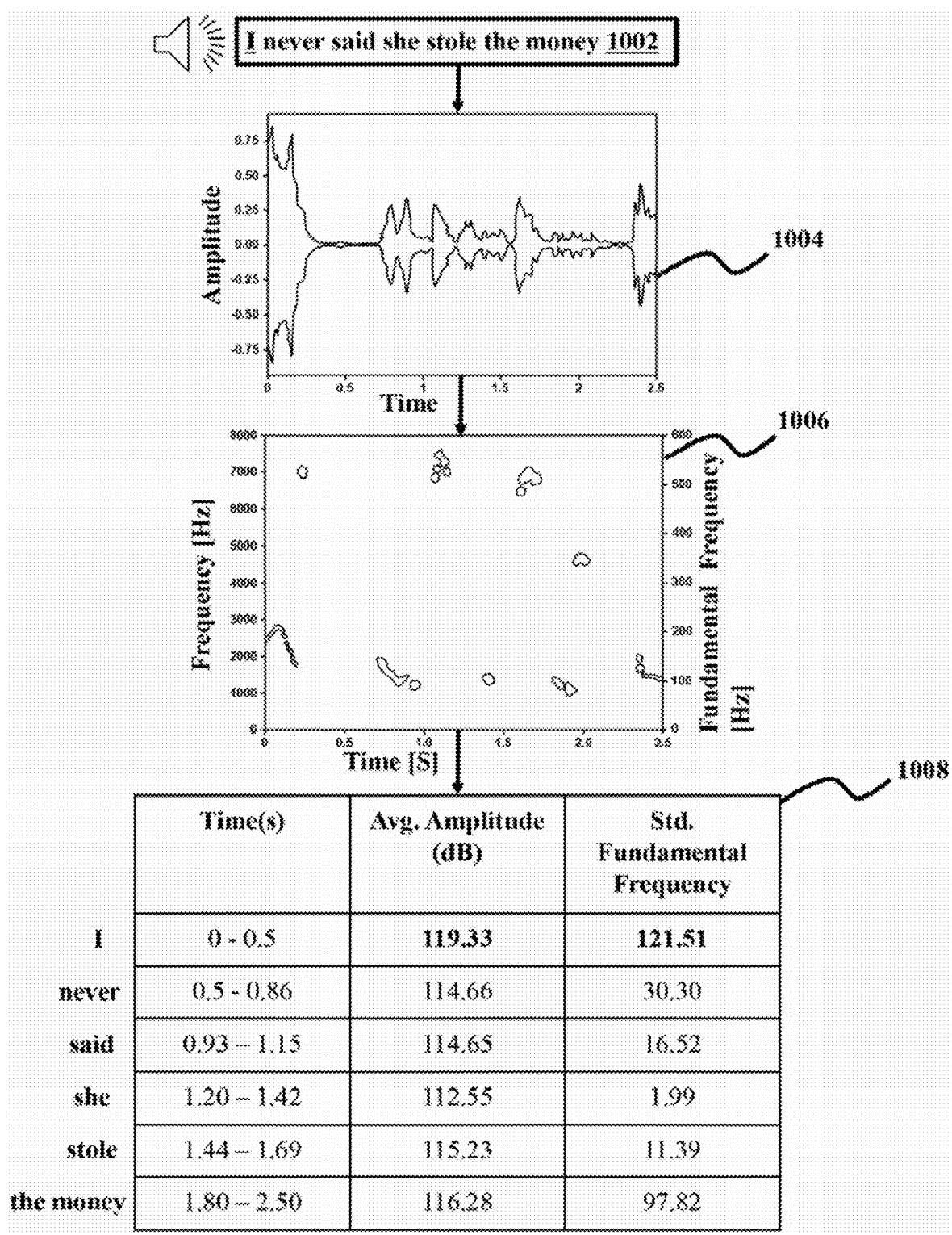
FIGS. 10A, 10B, 10C and 10D are diagrams illustrating illustrate an example analysis of a sentence in terms of correlation between an emphasis on each word of the sentence and change in pitch and amplitude of the natural language information input, according to various embodiments.

FIGS. 10A, 10B, 10C and 10D are diagrams illustrating an example analysis of the sentence in terms of correlation between an emphasis on each word of the sentence and change in pitch and amplitude of the natural language information input, according to various embodiments. The sentence is analyzed in terms of correlation between an emphasis on each word of the sentence and change in pitch and amplitude of the natural language information input. For example, consider, the sentence "I never said she stole the money (1002)" where the word "I" is an emphasized word as shown in FIG. 10A A first graph (1004) shows a high amplitude of the emphasized word 'I' with respect to time. A second graph (1006) shows a high frequency of the emphasized word 'I' with respect to a fundamental frequency. A table (1008) shows different values of the sentence "I" never said she stole the money (1002) based on the high amplitude and the high frequency of the emphasized word "I".

Figure 10B:
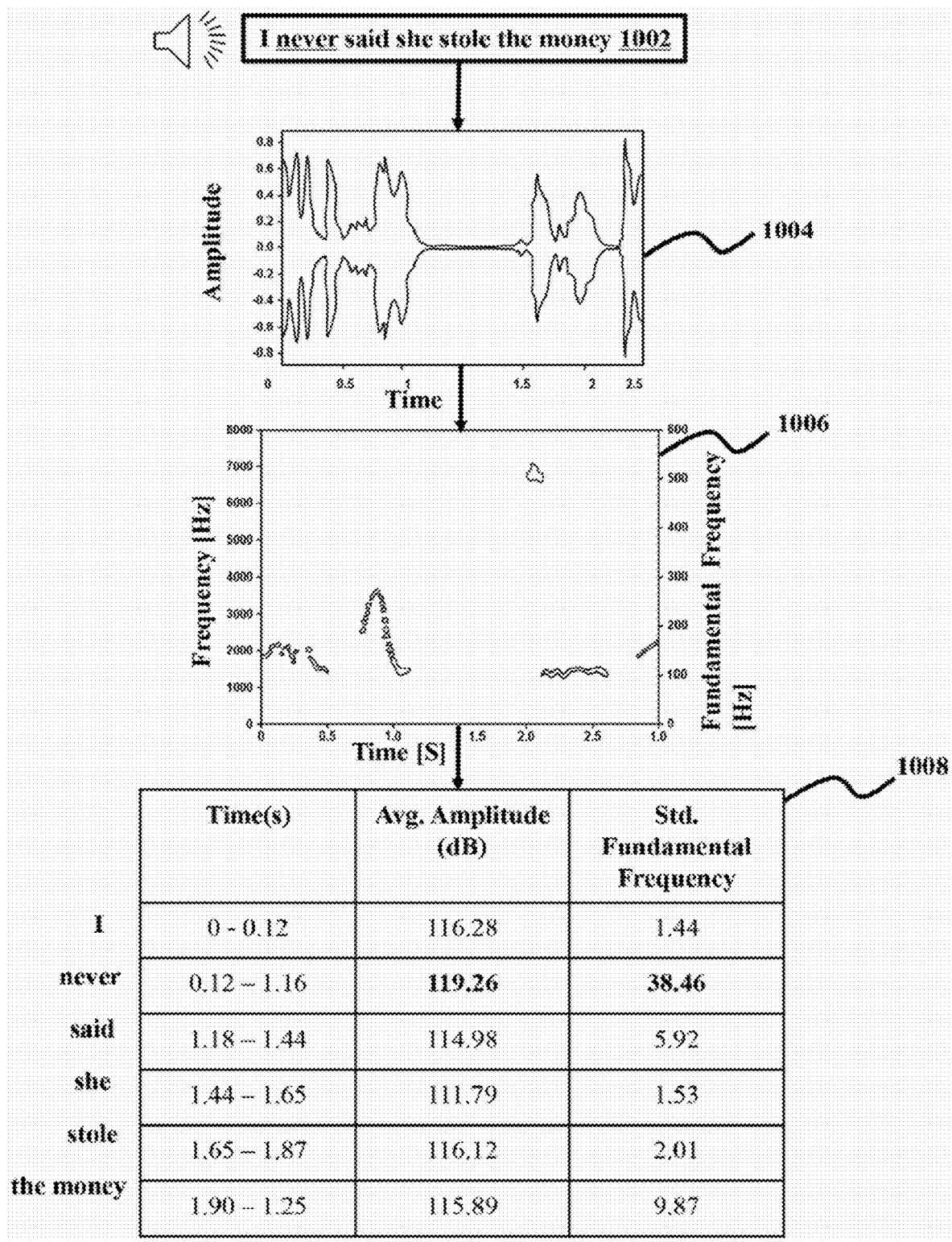

Referring to FIG. 10B, the sentence "I never said she stole the money (1002)" where the word 'never' is an emphasized word. The first graph (1004) shows the high amplitude of the emphasized word 'never' with respect to time. The second graph (1006) shows the high frequency of the emphasized word 'never' with respect to the fundamental frequency. A table (1008) shows different values of the sentence "I never said she stole the money (1002)" based on the high amplitude and the high frequency of the emphasized word 'never'.

Figure 10C:
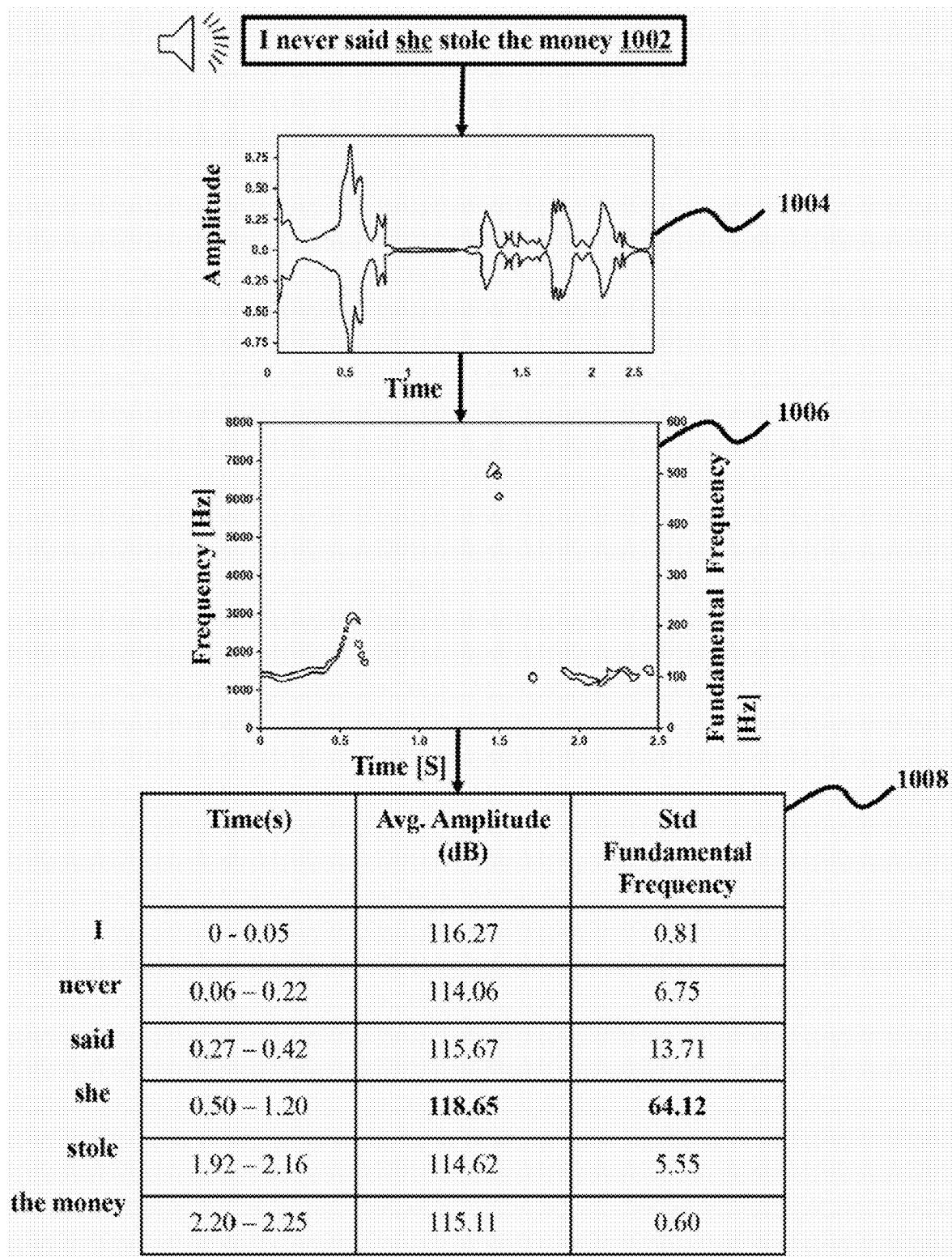

Referring to FIG. 10C, the sentence "I never said she stole the money (1002)" where the word 'she' is an emphasized word. The first graph (1004) shows the high amplitude of the emphasized word 'she' with respect to time. The second graph (1006) shows the high frequency of the emphasized word 'she' with respect to the fundamental frequency. A table (1008) shows different values of the sentence "I never said she stole the money (1002)" based on the high amplitude and the high frequency of the emphasized word 'she'.

Figure 10D:
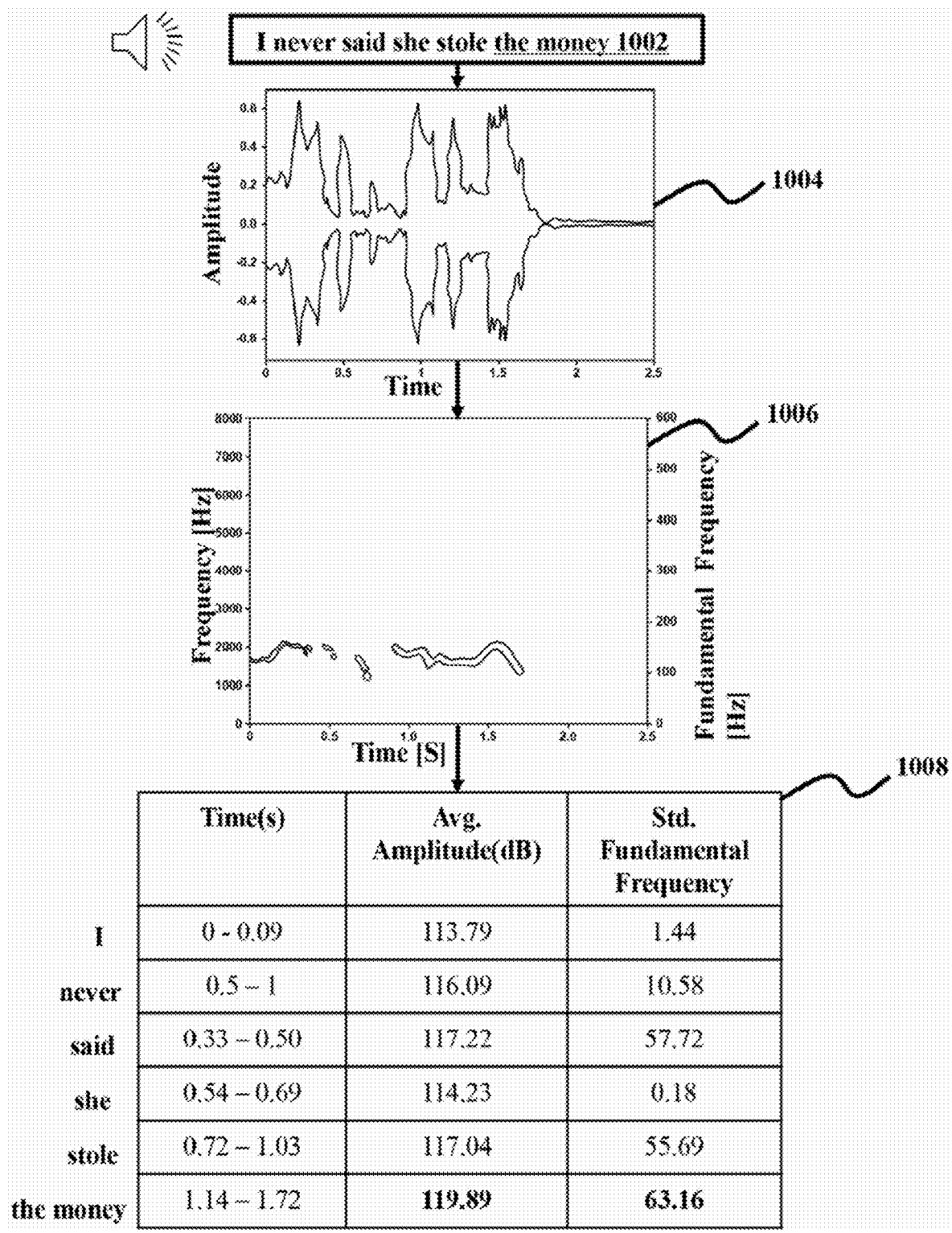

Referring to FIG. 10D, the sentence "I never said she stole the money (1002)" where the word 'the money' is an emphasized word. The first graph (1004) shows the high amplitude of the emphasized word 'the money' with respect to time. The second graph (1006) shows the high frequency of the emphasized word 'the money' with respect to the fundamental frequency. A table (1008) shows different values of the sentence "I never said the money (1002)" based on the high amplitude and the high frequency of the emphasized word 'the money'.

Figure 11A:
FIG. 11A is a diagram illustrating an example user interface while watching a movie on the electronic device, according to various embodiments.

FIG. 11A is a diagram illustrating an example of a user interface while watching a movie on the electronic device (100), according to various embodiments. In an embodiment, consider the user of the electronic device (100) watching the movie (1102), the sign language controller (150) provides a sign language (1104) for movie contents.

Figure 11B:
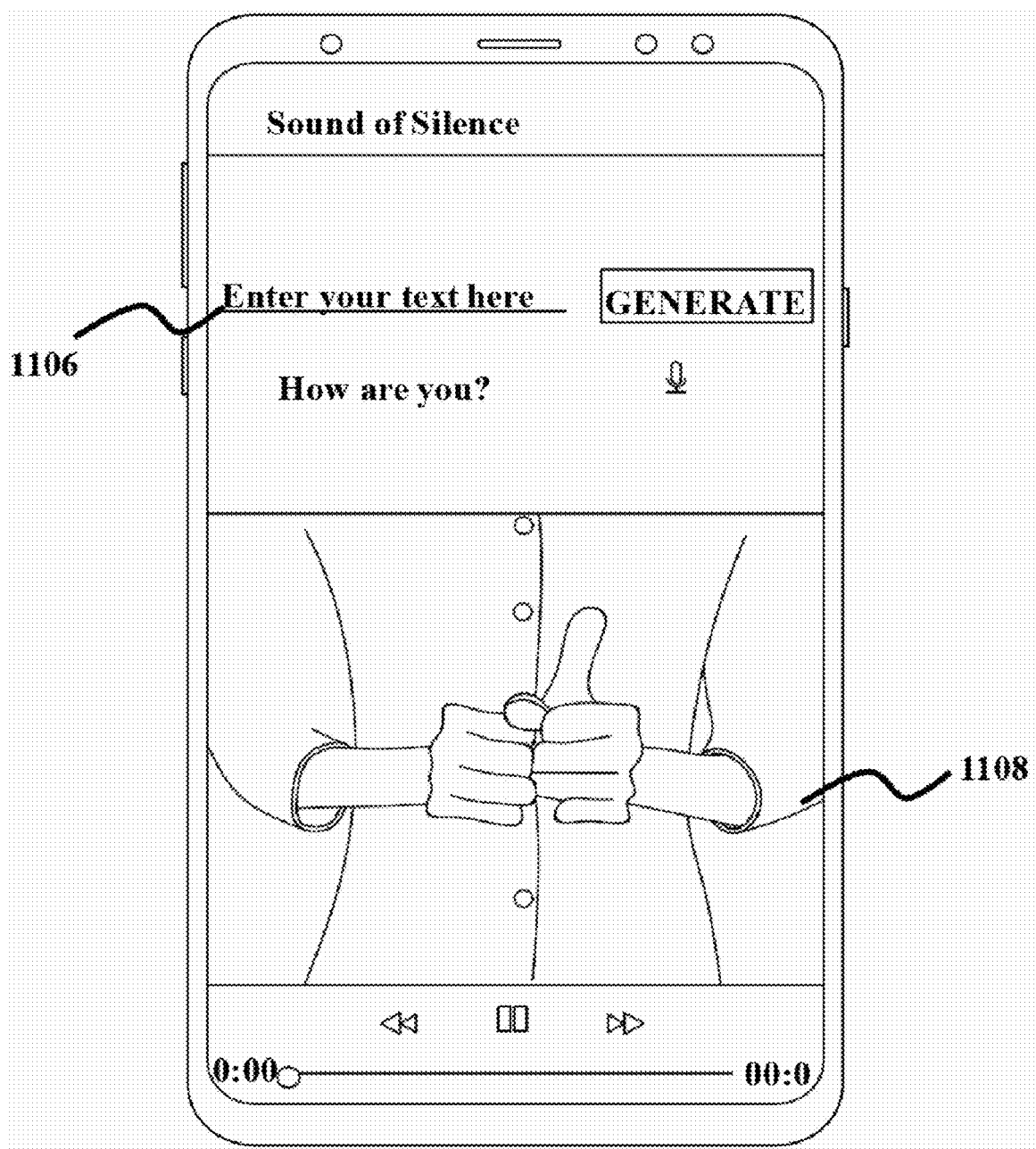
FIG. 11B is a diagram illustrating another example of a user interface generating the sign language for an entered sentence, according to various embodiments.

FIG. 11B is a diagram illustrating another example of the user interface generating the sign language for an entered text (1106), according to various embodiments. The user may enter a text (1006) and the three-dimensional model generator (810) generates a sign language (1108) for the entered sentence (1106).

Figure 12:
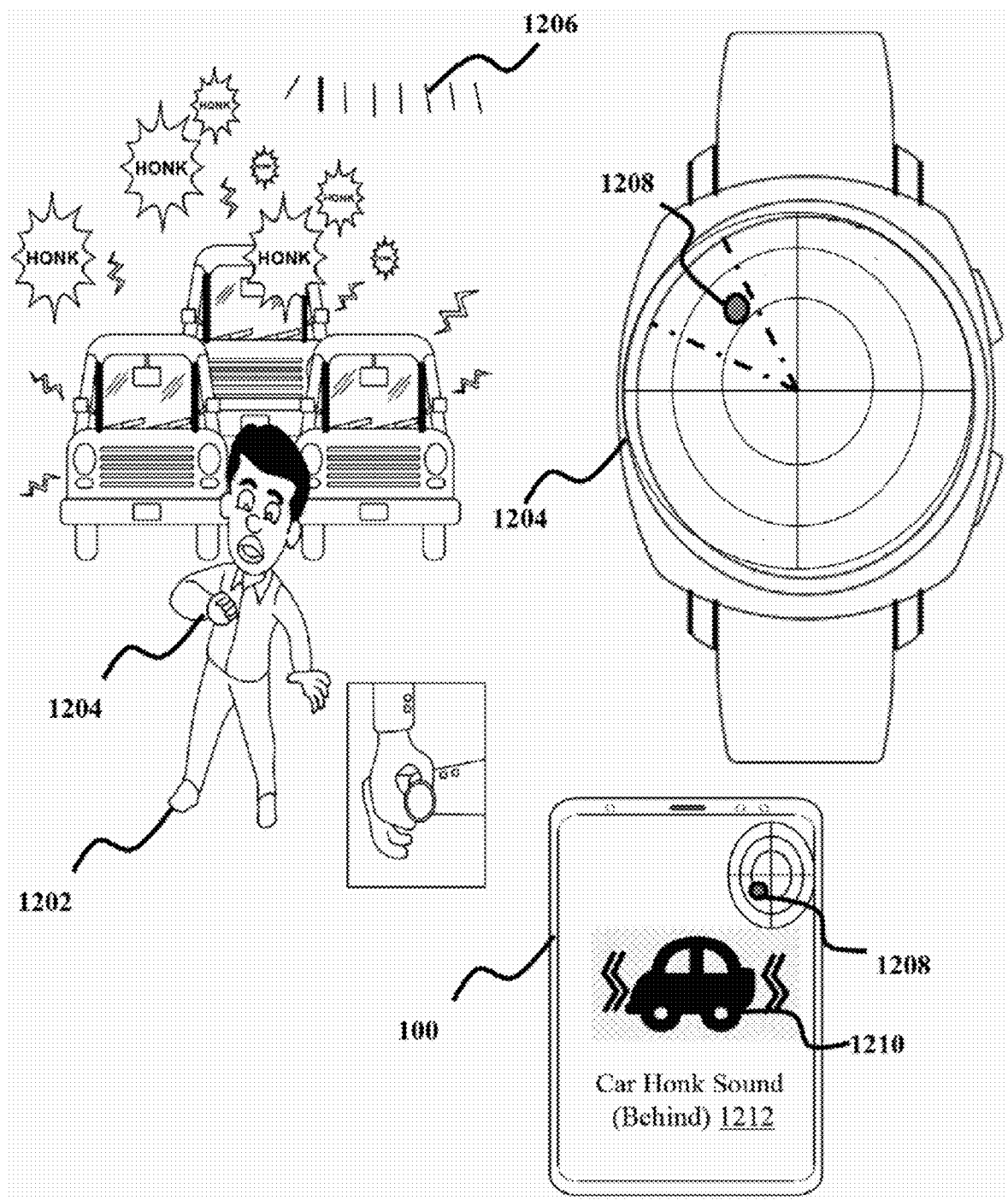
FIG. 12 is a diagram illustrating an example of detecting and displaying the direction of sound on the electronic device and a smart watch, according to various embodiments.

FIG. 12 is a diagram illustrating an example of detecting and displaying the direction of sound on the electronic device (100) and a smart watch (1204), according to various embodiments. The sign language controller (150) in the electronic device (100) detects the direction of the sound (1206) towards a user (1202) when the user (1202) is walking on a road. The direction of the sound (1206) is displayed on the electronic device (100) and the smart watch (1204) as an indicator (1208). The direction of sound (1206) is shown in FIG. 12 as a car honking sound (1210) with the indicator (1208) and the direction of sound (1206) coming from a behind (1212) the user (1202).

Figure 13A:
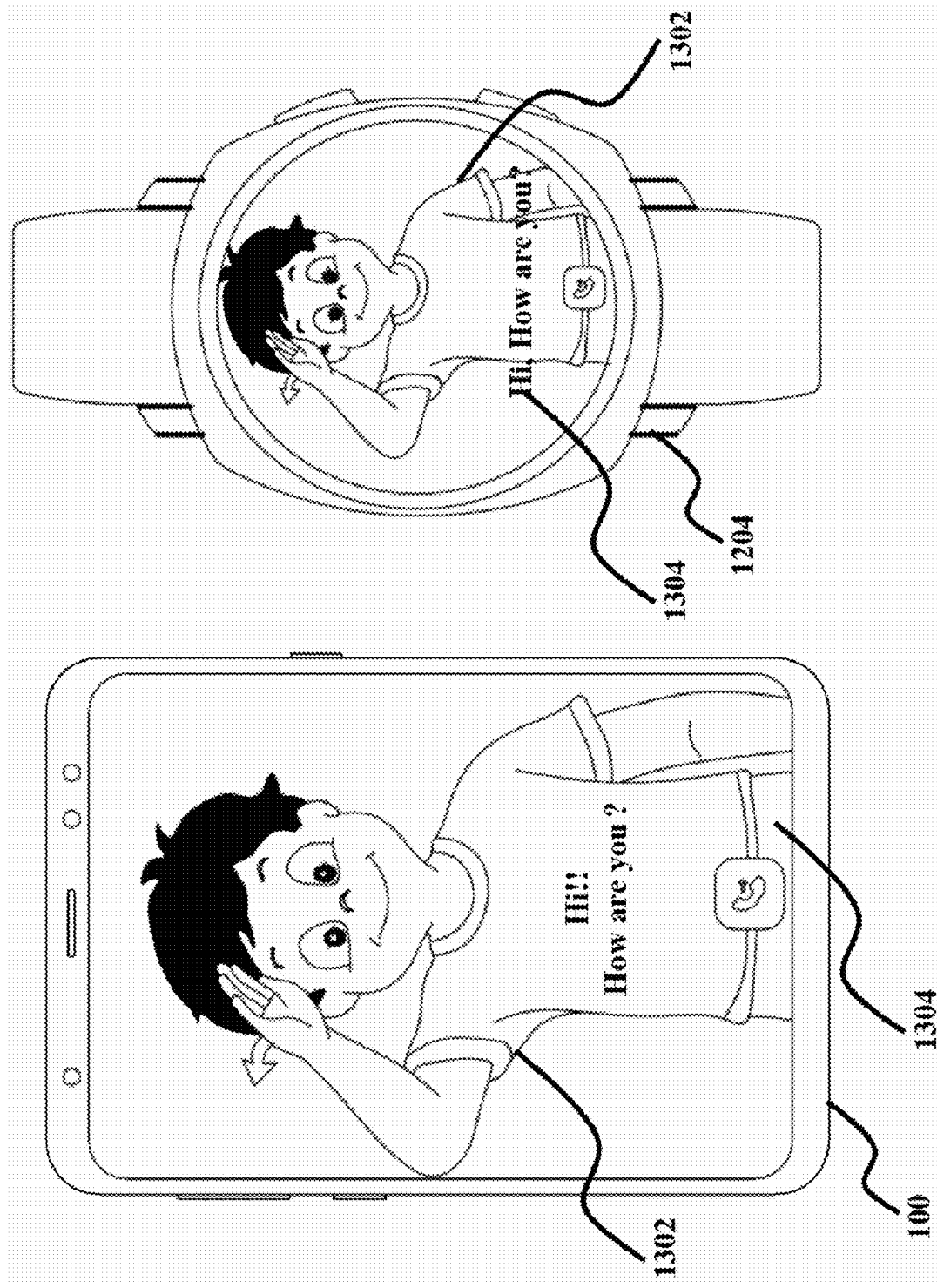
FIG. 13A is a diagram illustrating an example of a user interface where the three-dimensional model is greeting a user, according to various embodiments.

FIG. 13A is a diagram illustrating an example of a user interface where the three-dimensional model is greeting the user, according to various embodiments. The three-dimensional model (1302) is displayed on electronic device (100) and the smart watch (1204) greeting the user with "Hi!! How are you?" (1304).

Figure 13B:
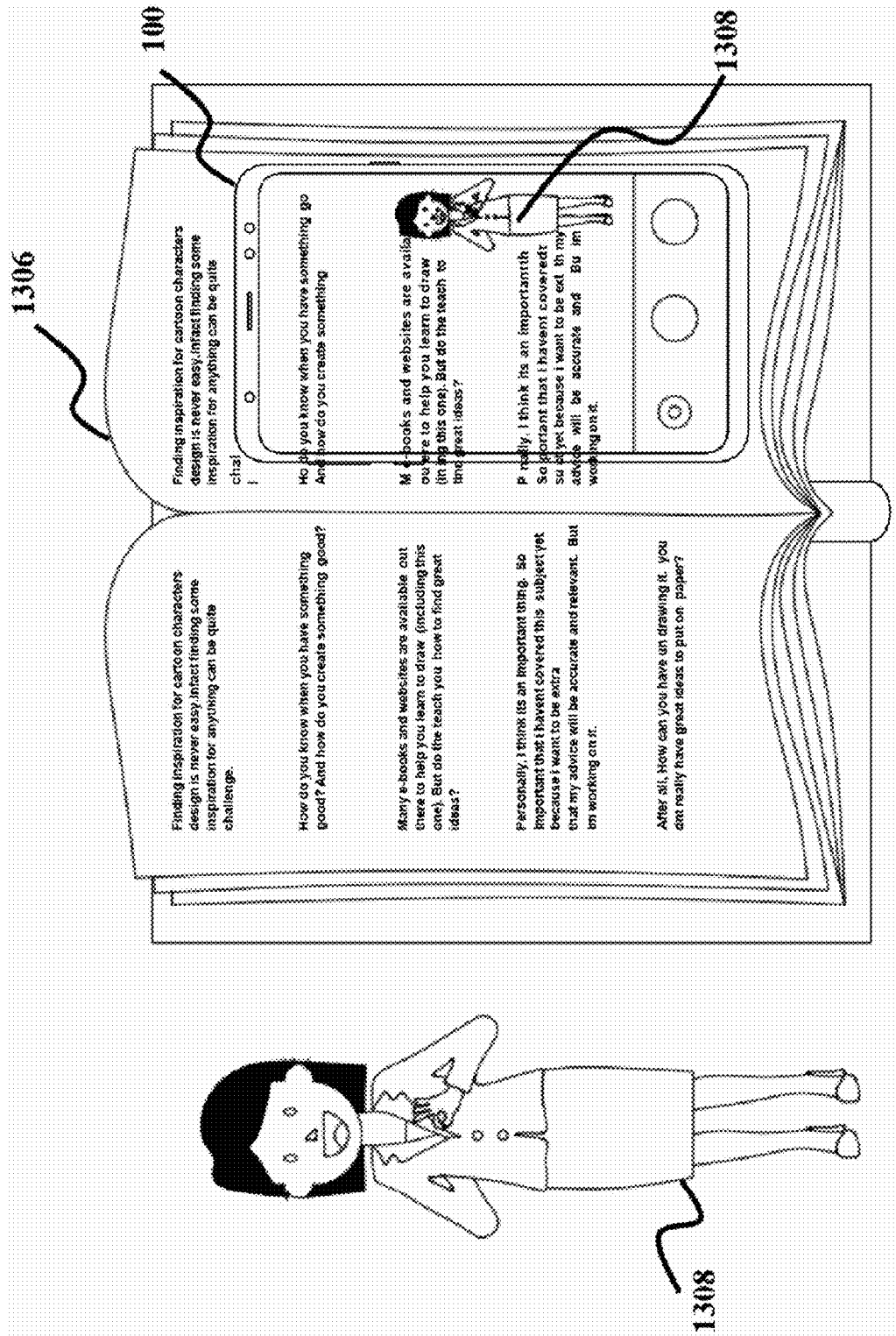
FIG. 13B is a diagram illustrating another example of a user interface with the three-dimensional model providing the sign language to the user while the user is reading a book, according to various embodiments.

FIG. 13B is a diagram illustrating another example of the user interface with the three-dimensional model providing the sign language to the user while the user is reading a book (1306), according to various embodiments. While the user is reading the book (1306), the user may point the electronic device (100) on a page of the book (1306) the user is reading, the sign language controller (150) will provide the sign language for the pointed page through the three-dimensional model (1308).

Figure 14A:
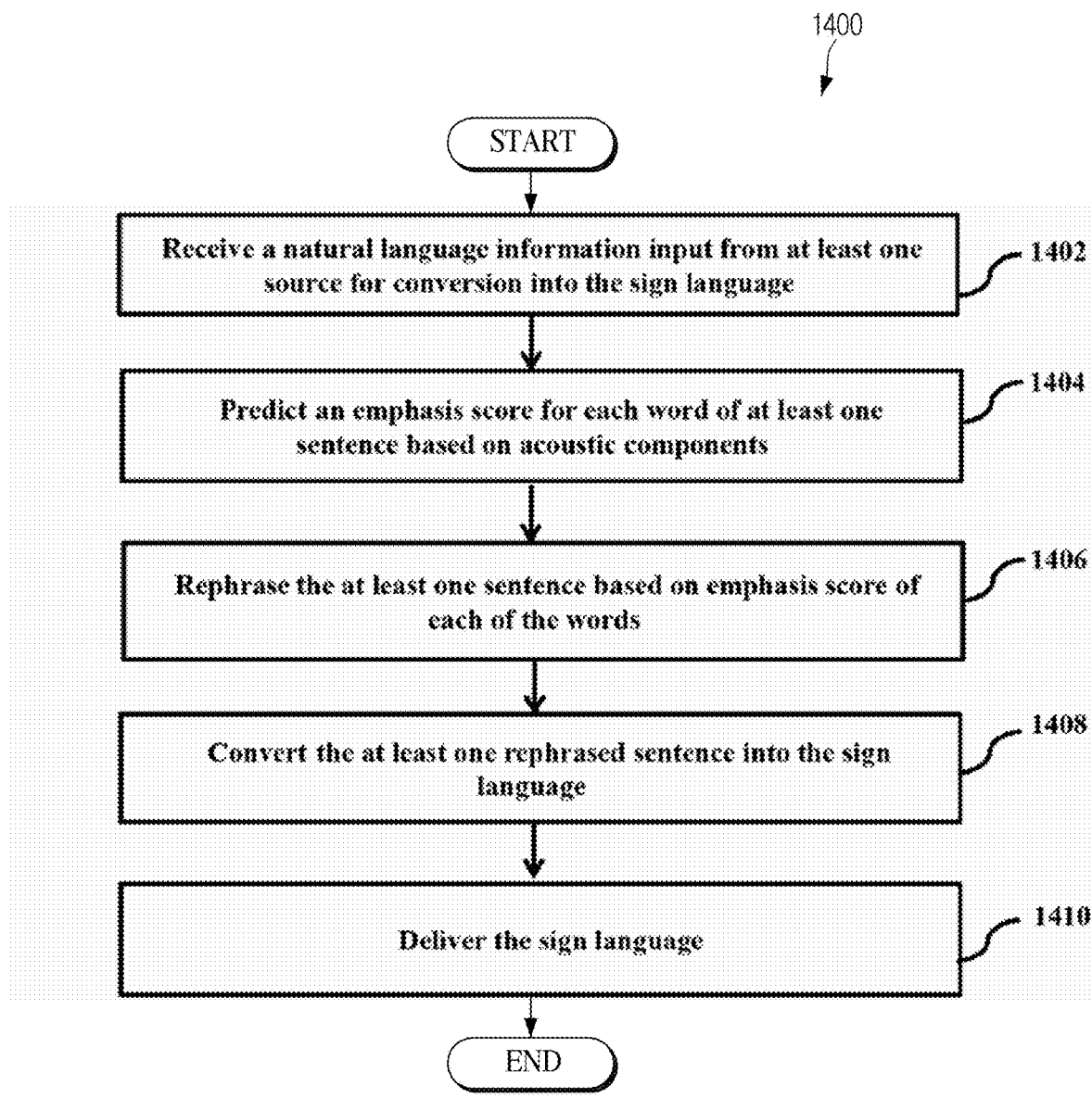
FIG. 14A is a flowchart illustrating an example method for providing a sign language, according to various embodiments.

FIG. 14A is a flowchart illustrating an example method (1400) for providing a sign language, according to various embodiments. At operation 1402, the method (1400) includes receiving, by the electronic device (100), a natural language information input from at least one source for conversion into the sign language. The natural language information input includes at least one sentence. At operation 1404, the method (1400) includes predicting, by the electronic device (100), an emphasis score for each word of the at least one sentence based on acoustic components. At operation 1406, the method (1400) includes rephrasing, by the electronic device (100), the at least one sentence based on the emphasis score of each of the words. At operation 1408, the method (1400) includes converting, by the electronic device (100), the at least one rephrased sentence into the sign language. At operation 1410, the method (1400) includes delivering, by the electronic device (100), the sign language.

Figure 14B:
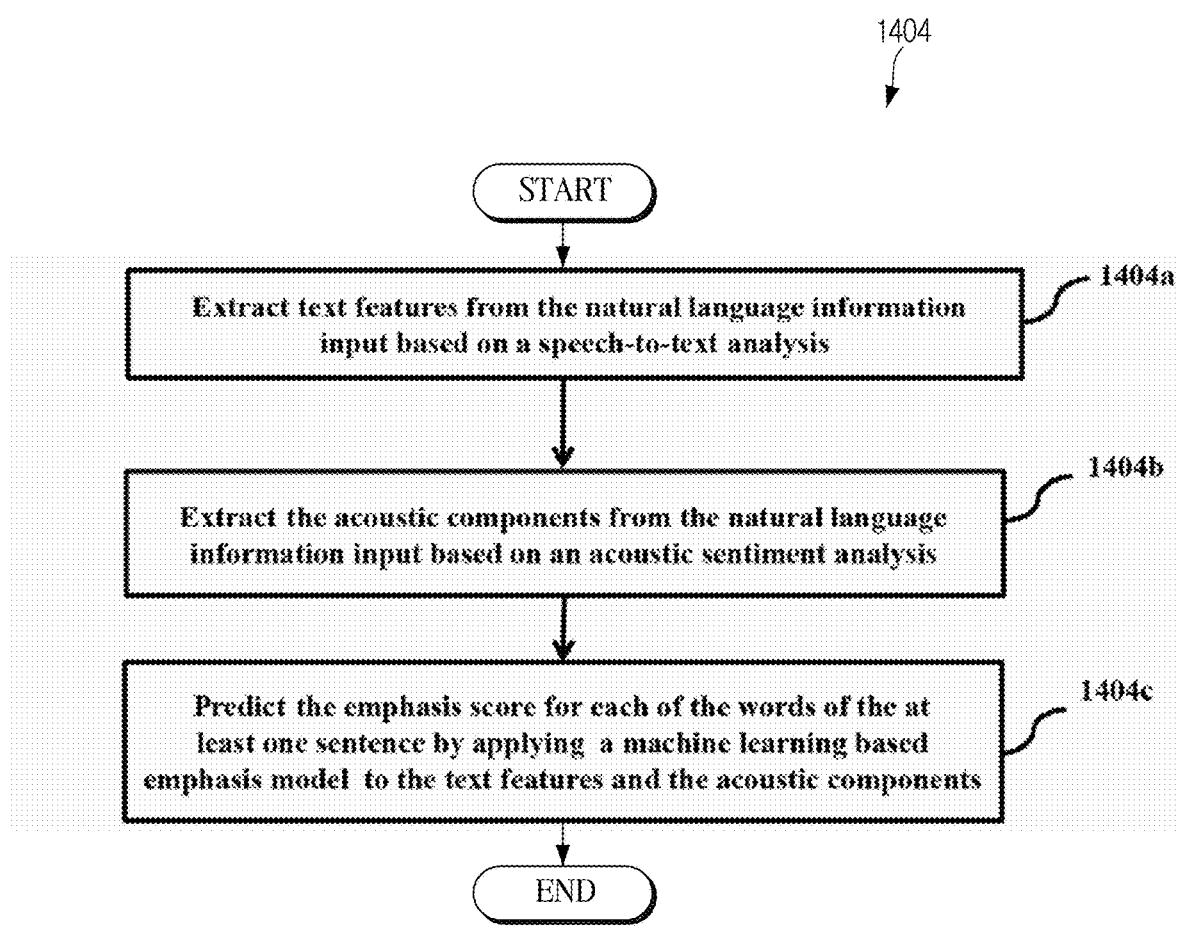
FIG. 14B is a flowchart illustrating an example method for predicting an emphasis score for each word of the sentence based on an acoustic component, according to various embodiments.

FIG. 14B is a diagram illustrating an example method (1404) for predicting an emphasis score for each word of the at least one sentence based on an acoustic component, according to various embodiments. At operation 1404*a*, the method (1404) includes extracting text features from the natural language information input based on a speech-to-text analysis. At operation 1404*b*, the method (1404) includes extracting the acoustic components from the natural language information input based on an acoustic sentiment analysis. At operation 1404*c*, the method (1404) includes predicting the emphasis score for each of the words of the at least one sentence by applying a machine learning based emphasis model to the text features and the acoustic components.

Figure 14C:
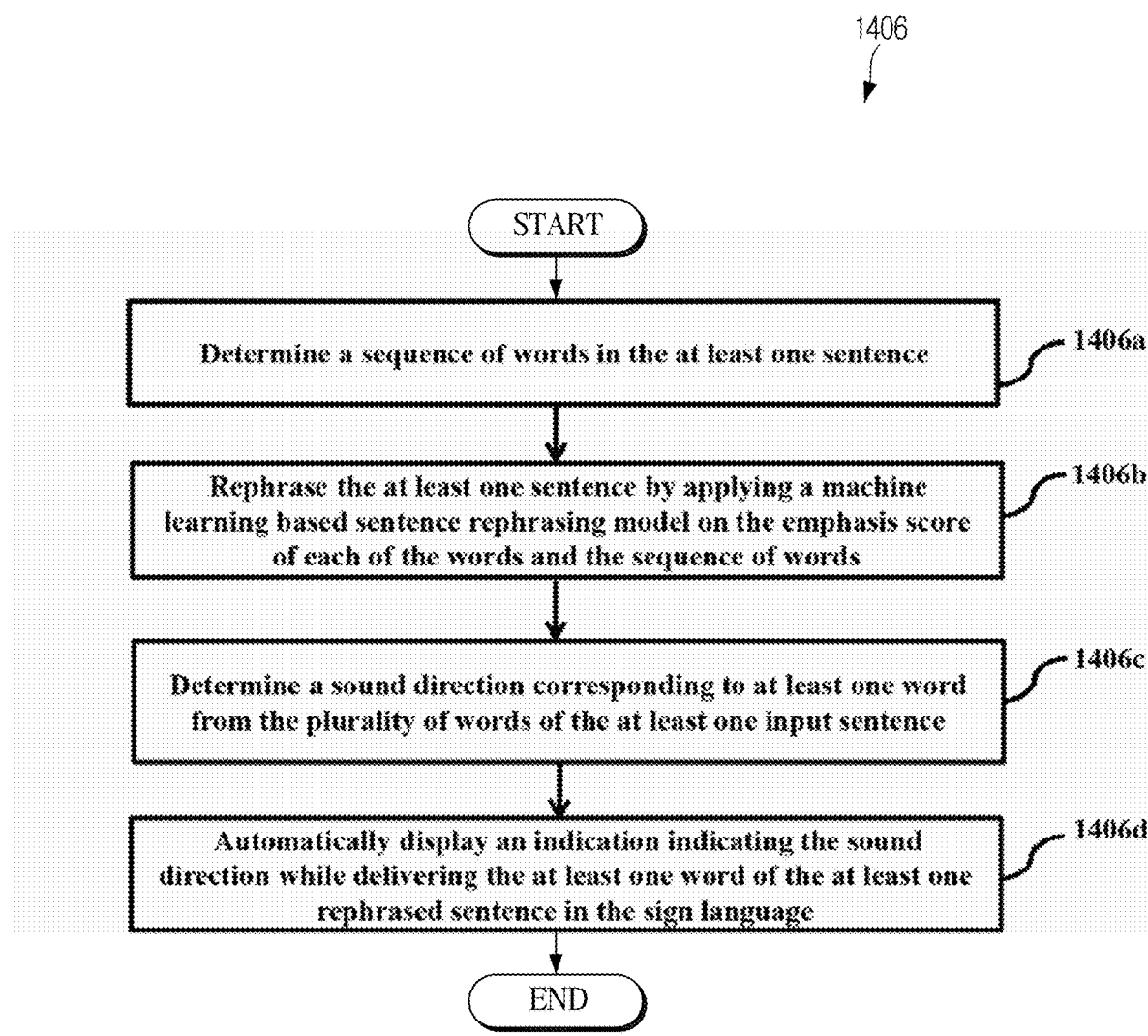
FIG. 14C is a flowchart illustrating an example method for rephrasing the sentence based on the emphasis score of each of the words, according to various embodiments.

FIG. 14C is a flowchart illustrating an example method (1406) for rephrasing the at least one sentence based on the emphasis score of each of the words, according to the embodiments as disclosed herein. At operation 1406*a*, the method (1406) includes determining a sequence of words in the at least one sentence. At operation 1406*b*, the method (1406) includes rephrasing the at least one sentence by applying a machine learning based sentence rephrasing model on the emphasis score of each of the words and the sequence of words. At operation 1406*c*, the method (1406) includes determining a sound direction corresponding to at least one word from the plurality of words of the at least one input sentence. At operation 1406*d*, the method (1406) includes automatically displaying an indication indicating the sound direction while delivering the at least one word of the at least one rephrased sentence in the sign language.

Figure 14D:
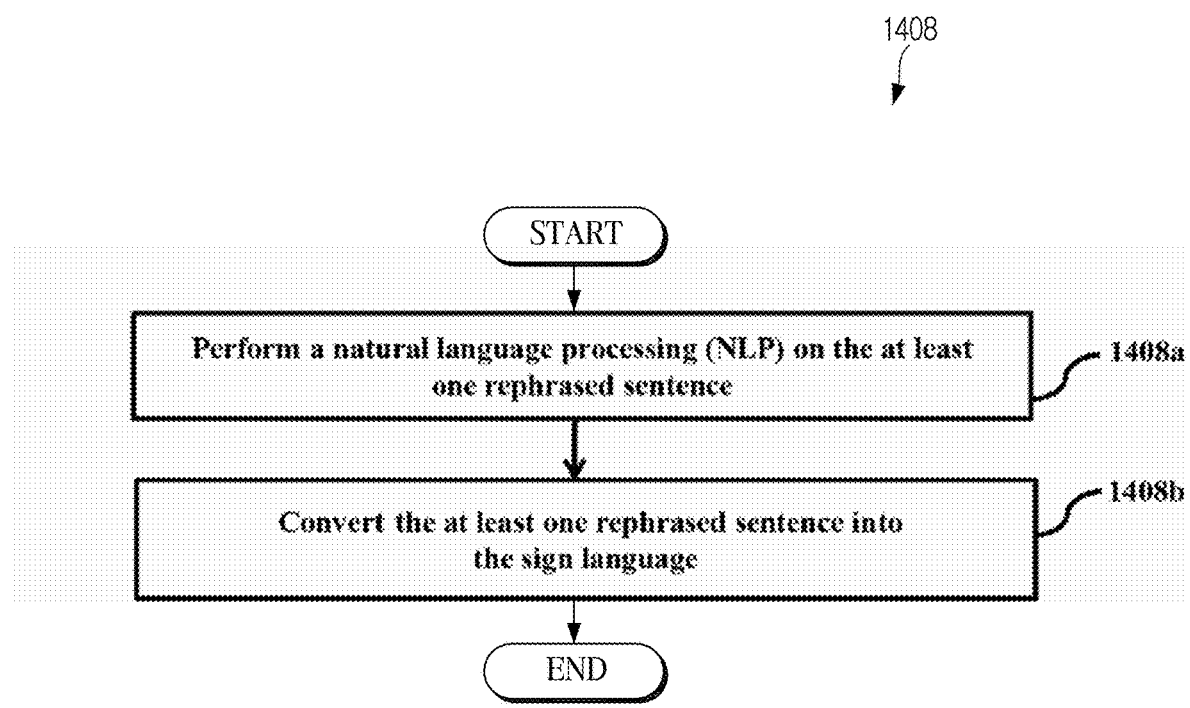
FIG. 14D is a flowchart illustrating an example method for converting the at least one rephrased sentence into the sign language, according to various embodiments.

FIG. 14D is a flowchart illustrating an example method (1408) for converting the at least one rephrased sentence into the sign language, according to various embodiments. At operation 1408*a*, the method (1408) includes performing a natural language processing (NLP) on the at least one rephrased sentence. At operation 1408*b*, the method (1408) includes converting the at least one rephrased sentence into the sign language.

Figure 14E:
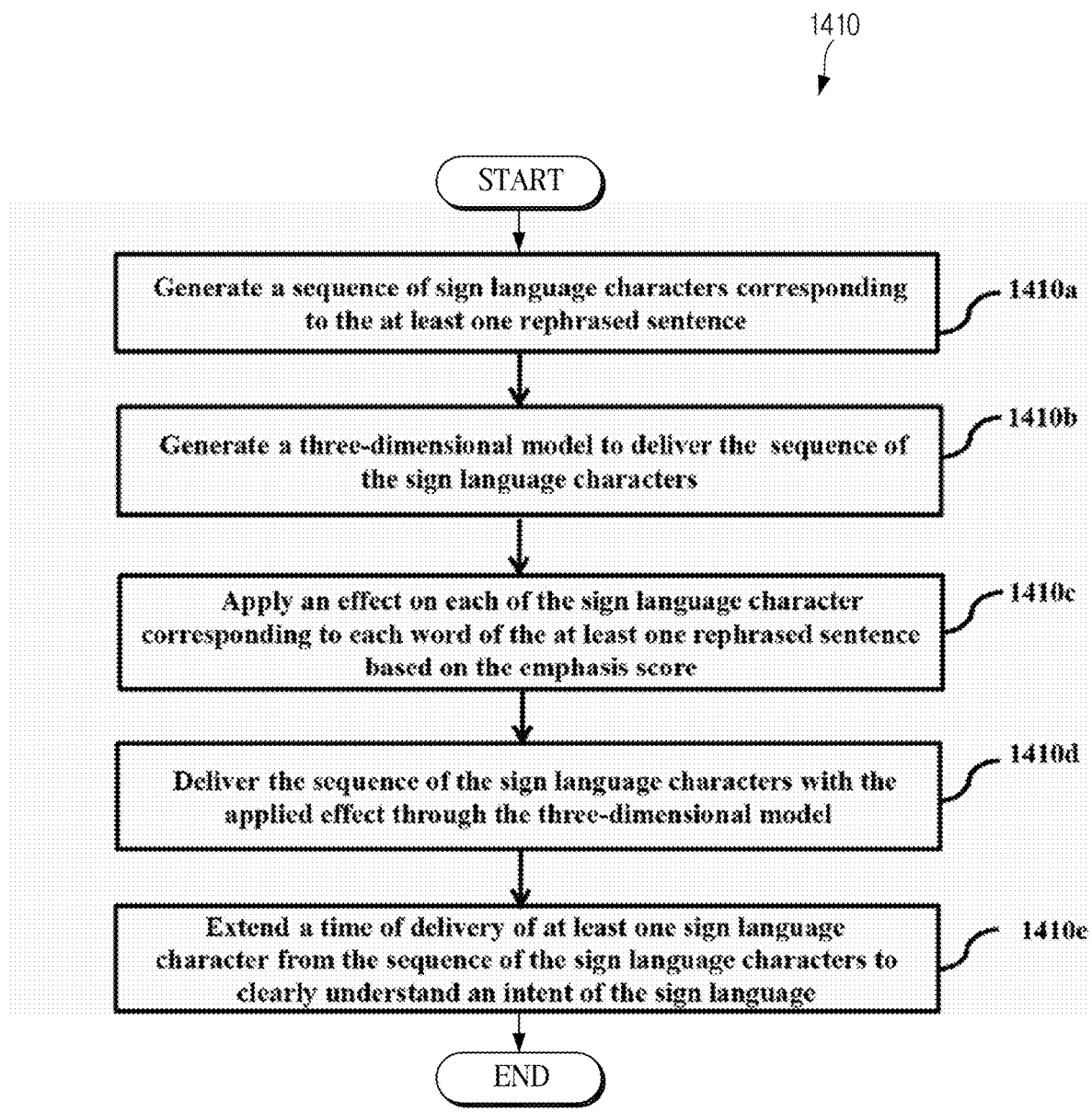
FIG. 14E is a flowchart illustrating an example method for delivering the sign language to the user, according to various embodiments.

FIG. 14E is a flowchart illustrating an example method (1410) for delivering the sign language to the user, according to various embodiments. At operation 1410*a*, the method (1410) includes generating a sequence of sign language characters corresponding to the at least one rephrased sentence. At operation 1410*b*, the method (1410) includes generating a three-dimensional model to deliver the sequence of the sign language characters. At operation 1410*c*, the method (1410) includes applying an effect on each of the sign language character corresponding to each word of the at least one rephrased sentence based on the emphasis score. At operation 1410*d*, the method (1410) includes delivering the sequence of the sign language characters with the applied effect through the three-dimensional model. At operation 1410*e*, the method (1410) includes extending a time of delivery of at least one sign language character from the sequence of the sign language characters to clearly understand an intent of the sign language.

The various example embodiments described above may be implemented in a recordable medium which is readable by computer or a device similar to computer using software, hardware, or the combination of software and hardware.

By hardware implementation, the embodiments of the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FP-GAs), processors, controllers, micro-controllers, microprocessors, electric units for performing other functions, or the like.

In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations of the robot cleaner 100 according to the various embodiments described above may be stored in a non-transitory computer-readable medium. The computer instructions stored in this non-transitory computer-readable medium may cause the above-described specific device to perform the processing operations in the robot cleaner 100 according to the above-described various example embodiments when executed by the processor of the specific device.

The non-transitory computer readable medium may refer, for example, to a medium that stores data semi-permanently, such as a register, a cache, a memory or etc., and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing description of the various example embodiments reveals the general nature of the embodiments herein and, by applying current knowledge, one skilled in the art will recognize and be able to modify and/or adapt for various applications such embodiments without departing from the concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the spirit and scope of the embodiments as described herein.

What is claimed is:

1. A method for providing sign language, the method comprising:

receiving, by an electronic device, a natural language information input from at least one source for conversion into the sign language, wherein the natural language information input comprises at least one sentence;

extracting, by the electronic device, text features from the natural language information input based on a speech-to-text analysis;

extracting, by the electronic device, acoustic components from the natural language information input based on an acoustic sentiment analysis; and predicting, by the electronic device, an emphasis score for each word of the at least one sentence by applying a machine learning based emphasis model to the text features and the acoustic components;

rephrasing, by the electronic device, the at least one sentence based on the emphasis score of each of the words;

converting, by the electronic device, the at least one rephrased sentence into sign language; and delivering, by the electronic device, the sign language, wherein the machine learning based emphasis model is trained based on at least one dataset of audio labeled with at least emphasize words.

2. The method as claimed in claim 1, wherein the method comprises:

determining, by the electronic device, a sound direction corresponding to at least one word from the plurality of words of the at least one input sentence; and automatically displaying, by the electronic device, an indication indicating the sound direction while delivering the at least one word of the at least one rephrased sentence in the sign language.

3. The method as claimed in claim 1, wherein rephrasing, by the electronic device, the at least one sentence based on the emphasis score of each of the words comprises:

determining, by the electronic device, a sequence of words in the at least one sentence; and rephrasing, by the electronic device, the at least one sentence by applying a machine learning based sentence rephrasing model on the emphasis score of each of the words and the sequence of words.

4. The method as claimed in claim 3, wherein the machine learning based sentence rephrasing model is trained based on at least one of sign language grammar, sentence rephrasing model and text sentiment analysis.

5. The method as claimed in claim 1, wherein converting, by the electronic device, the at least one rephrased sentence into the sign language comprises:

performing, by the electronic device, a natural language processing (NLP) on the at least one rephrased sentence; and converting, by the electronic device, the at least one rephrased sentence into the sign language.

6. The method as claimed in claim 1, wherein delivering, by the electronic device, the sign language comprises:

generating, by the electronic device, a sequence of sign language characters corresponding to the at least one rephrased sentence, wherein each of the words in the at least one rephrased sentence is associated with the emphasis score;

generating, by the electronic device, a three-dimensional model to deliver the sequence of the sign language characters;

applying, by the electronic device, an effect on each of the sign language character corresponding to each word of the at least one rephrased sentence based on the emphasis score; and delivering, by the electronic device, the sequence of the sign language characters with the applied effect through the three-dimensional model.

7. The method as claimed in claim 6, wherein the effect comprises at least one of providing a facial expression to a three-dimensional character while delivering the sign language character from the sequence of the sign language characters, and extending a time of delivery of at least one sign language character from the sequence of the sign language characters to clearly understand an intent of the sign language.

8. The method as claimed in claim 1, comprising: providing, by the electronic device, smooth transition of gestures of the three-dimensional character based on the at least one rephrased sentence while delivering the sign language.

9. An electronic device configured to provide sign language, the electronic device comprising:
   a memory;
   a processor; and
   a sign language controller comprising circuitry, communicatively connected to the memory and the processor, the sign language controller configured to:
   receive a natural language information input from at least one source for conversion into sign language, wherein the natural language information input comprises at least one sentence;
   extract text features from the natural language information input based on a speech-to-text analysis;
   extract acoustic components from the natural language information input based on an acoustic sentiment analysis;
   predict the emphasis score for each word of the at least one sentence by applying a machine learning based emphasis model on the text features and the acoustic components;
   rephrase the at least one sentence based on the emphasis score of each of the words;
   convert the at least one rephrased sentence into the sign language; and
   deliver the sign language;
   wherein the machine learning based emphasis model is trained based on at least one dataset of audio labeled with at least emphasize words.

10. The electronic device as claimed in claim 9, wherein the sign language controller is configured to:
    determine a sound direction corresponding to at least one word from the plurality of words of the at least one input sentence; and
    automatically display an indication indicating the sound direction while delivering the at least one word of the at least one rephrased sentence in the sign language.

11. The electronic device as claimed in claim 9, wherein the rephrasing the at least one sentence based on the emphasis score of each of the words comprises:
    determining a sequence of words in the at least one sentence; and
    rephrasing the at least one sentence by applying a machine learning based sentence rephrasing model to the emphasis score of each of the words and the sequence of words.

12. The electronic device as claimed in claim 11, wherein the machine learning based sentence rephrasing model is trained based on at least one of sign language grammar, sentence rephrasing model and text sentiment analysis.

13. The electronic device as claimed in claim 9, wherein the converting the at least one rephrased sentence into sign language comprises:
    performing a natural language processing (NLP) on the at least one rephrased sentence; and
    converting the at least one rephrased sentence into the sign language.

14. The electronic device as claimed in claim 9, wherein the delivering the sign language comprises:
    generating a sequence of sign language characters corresponding to the at least one rephrased sentence, wherein each of the words in the at least one rephrased sentence is associated with the emphasis score;
    generating a three-dimensional model to deliver the sequence of the sign language characters;
    applying an effect on each of the sign language character corresponding to each word of the at least one rephrased sentence based on the emphasis score; and
    delivering the sequence of the sign language characters with the applied effect through the three-dimensional model.

15. The electronic device as claimed in claim 14, wherein the effect comprises at least one of providing a facial expression to a three-dimensional character while delivering the sign language character from the sequence of the sign language characters, and
    extending a time of delivery of at least one sign language character from the sequence of the sign language characters to clearly understand an intent of the sign language.

16. The electronic device as claimed in claim 9, wherein the sign language controller is configured to provide smooth transition of gestures of the three-dimensional character based on the at least one rephrased sentence while delivering the sign language.

* * * * *